United States Patent
Yu et al.

(10) Patent No.: US 12,222,169 B2
(45) Date of Patent: Feb. 11, 2025

(54) DEVICES AND METHODS FOR RADIATIVE COOLING

(71) Applicant: THE TRUSTEES OF COLUMBIA UNIVERSITY IN THE CITY OF NEW YORK, New York, NY (US)

(72) Inventors: Nanfang Yu, Fort Lee, NJ (US); Norman Shi, San Jose, CA (US); Meng Tian, Fort Lee, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 18/327,184

(22) Filed: Jun. 1, 2023

(65) Prior Publication Data

US 2024/0011724 A1    Jan. 11, 2024

Related U.S. Application Data

(60) Division of application No. 16/793,668, filed on Feb. 18, 2020, now Pat. No. 11,703,289, which is a
(Continued)

(51) Int. Cl.
*D06M 11/00* (2006.01)
*B82Y 30/00* (2011.01)
(Continued)

(52) U.S. Cl.
CPC ............ *F28F 13/003* (2013.01); *B82Y 30/00* (2013.01); *D01D 1/06* (2013.01); *D01D 1/106* (2013.01);
(Continued)

(58) Field of Classification Search
CPC .... D04H 1/4391; D04H 1/43916; D01D 5/06; D01D 5/247; D01F 1/10; D01F 1/106;
(Continued)

(56) References Cited

U.S. PATENT DOCUMENTS

| | | |
|---|---|---|
| 4,072,400 A | 2/1978 | Claypoole et al. |
| 6,317,555 B1 | 11/2001 | Maron et al. |

(Continued)

FOREIGN PATENT DOCUMENTS

| | | |
|---|---|---|
| CN | 101144217 A | 3/2008 |
| CN | 102031581 A | 4/2011 |
| WO | WO 2016/205717 A1 | 12/2016 |

OTHER PUBLICATIONS

U.S. Appl. No. 16/793,668 (U.S. Appl. No. 11/703,289), filed Jun. 1, 2023 (filed Jul. 18, 2023).
(Continued)

*Primary Examiner* — Jeremy R Pierce
*Assistant Examiner* — Christine X Nisula
(74) *Attorney, Agent, or Firm* — Baker Botts LLP

(57) ABSTRACT

Devices for radiative cooling and optical waveguiding are provided, wherein the devices comprise a fabric including one or more fibers extending for a length in a longitudinal direction and a plurality of void structures positioned within each of the one or more fibers and extended over the length of each of the one or more fibers. Each of the plurality of void structures is configured to scatter at least a portion of an electromagnetic radiation received thereon to thereby radiatively cool the object.

16 Claims, 19 Drawing Sheets

Related U.S. Application Data continuation of application No. PCT/US2018/000277, filed on Aug. 15, 2018.

(60) Provisional application No. 62/545,909, filed on Aug. 15, 2017.

(51) Int. Cl.

| | | |
|---|---|---|
| *D01D 1/06* | (2006.01) | |
| *D01D 1/10* | (2006.01) | |
| *D01D 5/06* | (2006.01) | |
| *D01D 5/16* | (2006.01) | |
| *D01D 5/247* | (2006.01) | |
| *D01F 1/04* | (2006.01) | |
| *D01F 1/06* | (2006.01) | |
| *D01F 1/10* | (2006.01) | |
| *D01F 2/00* | (2006.01) | |
| *D01F 4/02* | (2006.01) | |
| *D01F 6/12* | (2006.01) | |
| *F28F 13/00* | (2006.01) | |
| *G02B 6/10* | (2006.01) | |

(52) U.S. Cl.
CPC ............... *D01D 5/06* (2013.01); *D01D 5/16* (2013.01); *D01D 5/247* (2013.01); *D01F 1/04* (2013.01); *D01F 1/06* (2013.01); *D01F 1/106* (2013.01); *D01F 2/00* (2013.01); *D01F 4/02* (2013.01); *D01F 6/12* (2013.01); *D06M 11/00* (2013.01); *G02B 6/10* (2013.01); *D10B 2401/022* (2013.01); *D10B 2401/22* (2013.01); *D10B 2403/02421* (2013.01); *F28F 2245/06* (2013.01); *Y10T 428/25* (2015.01); *Y10T 428/2915* (2015.01)

(58) Field of Classification Search
CPC ............ D10B 2401/04; D10B 2401/10; D10B 2401/22; D04B 1/16
See application file for complete search history.

(56) References Cited

U.S. PATENT DOCUMENTS

| | | | |
|---|---|---|---|
| 7,532,798 | B2 | 5/2009 | Williams et al. |
| 2010/0231433 | A1 | 9/2010 | Tishin et al. |
| 2014/0147652 | A1* | 5/2014 | Bhatt ............... G02B 1/046 428/221 |
| 2014/0268815 | A1 | 9/2014 | Li et al. |
| 2015/0338175 | A1 | 11/2015 | Raman et al. |
| 2016/0108564 | A1 | 4/2016 | Topolkaraev et al. |
| 2019/0076819 | A1* | 3/2019 | Fujieda ............ B01J 20/28052 |
| 2019/0211476 | A1 | 7/2019 | Cui et al. |

OTHER PUBLICATIONS

U.S. Appl. No. 16/793,668, Jun. 1, 2023 Issue Fee Payment.
U.S. Appl. No. 16/793,668, Mar. 7, 2023 Notice of Allowance.
U.S. Appl. No. 16/793,668, Feb. 22, 2023 Response to Final Office Action.
U.S. Appl. No. 16/793,668, Nov. 1, 2022 Final Office Action.
U.S. Appl. No. 16/793,668, Sep. 20, 2022 Response to Non-Final Office Action.
U.S. Appl. No. 16/793,668, Jun. 24, 2022 Non-Final Office Action.
U.S. Appl. No. 16/793,668, Feb. 4, 2022 Response to Final Office Action and Request for Continued Examination.
U.S. Appl. No. 16/793,668, Nov. 19, 2021 Final Office Action.
U.S. Appl. No. 16/793,668, Oct. 29, 2021 Response to Non-Final Office Action.
U.S. Appl. No. 16/793,668, Jun. 9, 2021 Non-Final Office Action.
U.S. Appl. No. 16/793,668, Apr. 6, 2021 Response to Restriction Requirement.
U.S. Appl. No. 16/793,668, Nov. 25, 2020 Restriction Requirement.
Catyresse et al., "Photonic Structure Textile Design for Localized Thermal Cooling Based on a Fiber Blending Scheme," ACS Photonics 3(12):2420-2426 (2016).
Collins Dictionary, "Tubular", https://www.collinsdictionary.conn/US/dictionary/english/tubular (Year: 2021).
Hsu et al., "Radiative human body cooling by nanoporous polyethylene textile," Science 353(6303):1019-1023 (2016).
International Search Report mailed May 10, 2019 in International Application No. PCT/US18/00277.
Kou et al., "Daytime radiative cooling using near-black infrared emitters," ACS Photonics Feb. 2017 (14 pages).
Raman et al., "Passive radiative cooling below ambient air temperature under direct sunlight," Nature 515:540-544 (2014).
Shi et al., "Nanostructured fibers as a versatile photonic platform: radiative cooling and waveguiding through transverse Anderson localization," Light Sci Appl 7, 37 (2018). https://doi.org/10.1038/s41377-018-0033-x (Year: 2018).
Shi et al., "Nano-structured Wild Moth Cocoon Fibers as Radiative Cooling and Waveguiding Optical Materials," Conference on Lasers and Electro-Optics, May 2017 (2 pages).
Shi et al., "Nano-structured Wild Moth Cocoon Fibers as Radiative Cooling and Waveguiding Optical Materials," Proceedings SPIE 10367, Light in Nature VI No. 1036708, Sep. 2017 (9 pages).
Zhai et al., "Scalable-manufactured randomized glass-polymer hybrid metamaterial for daytime radiative cooling," Science 355:1062-1066 (2017).

\* cited by examiner

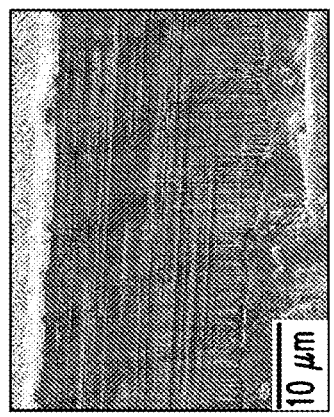
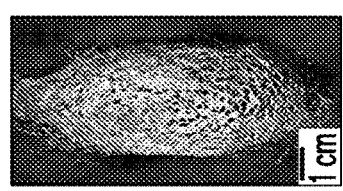
FIG. 1B
FIG. 1D
FIG. 1A
FIG. 1C

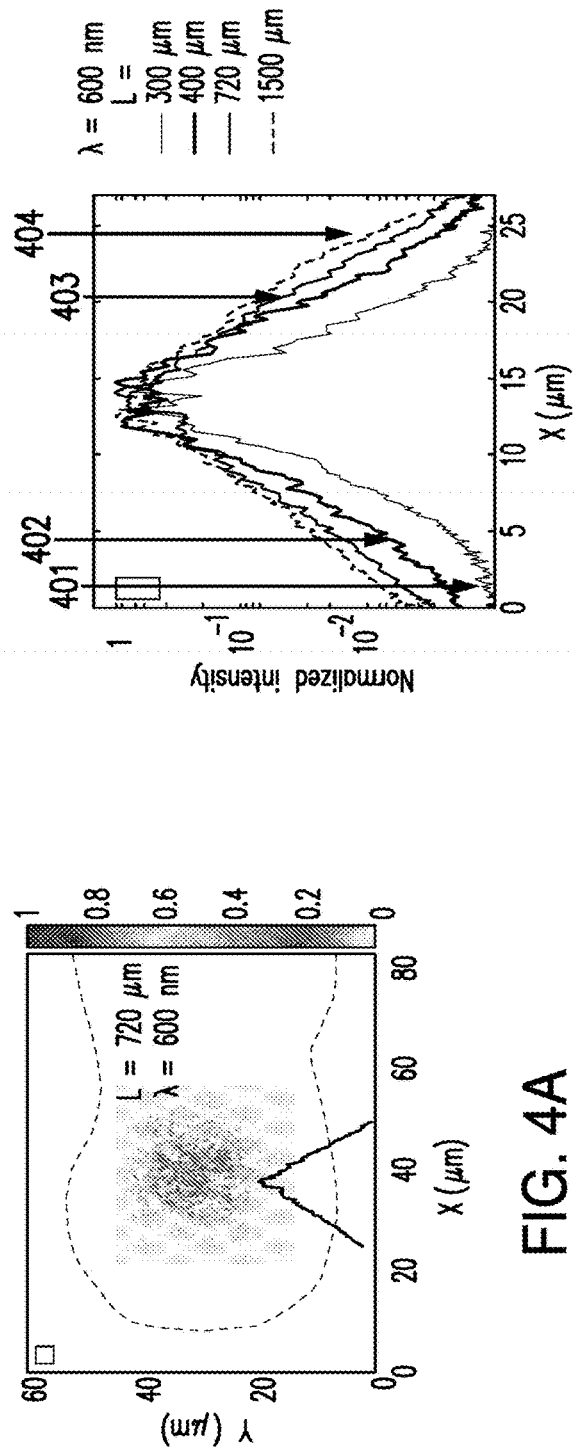
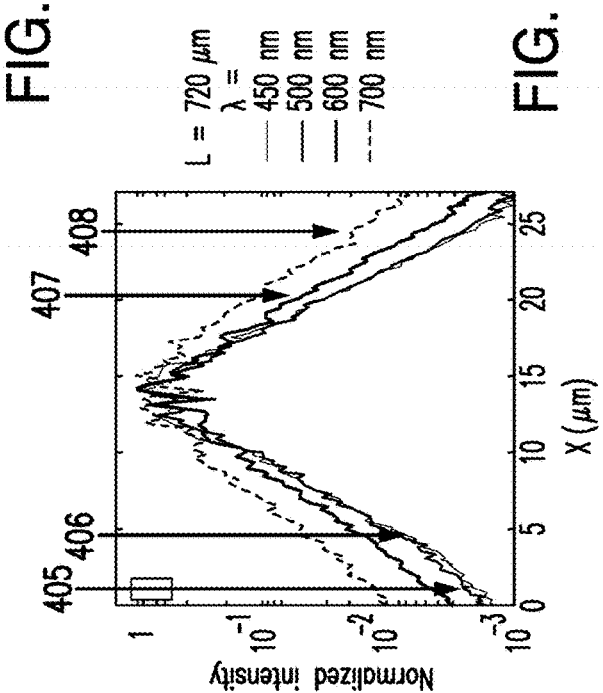
FIG. 4A
FIG. 4B
FIG. 4C

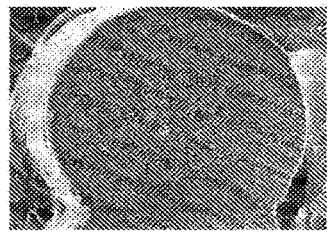 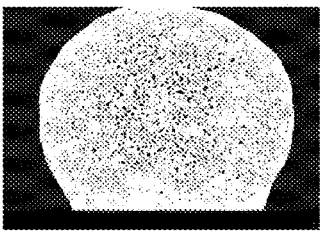 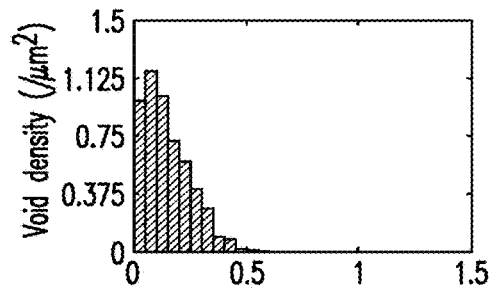
FIG. 5A   FIG. 5B   FIG. 5C
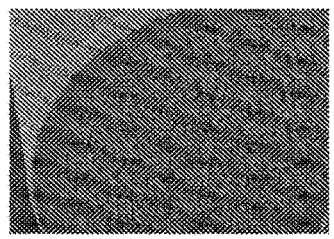 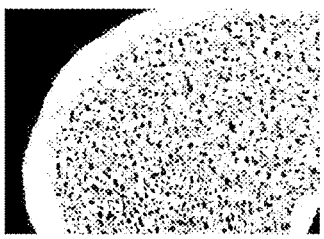 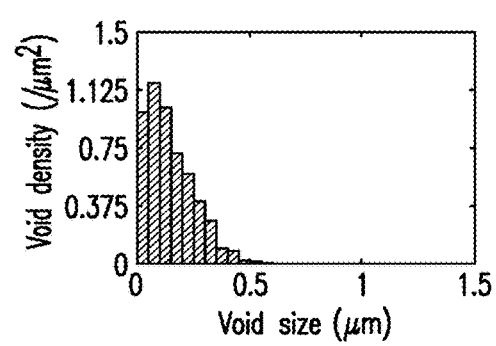
FIG. 5D   FIG. 5E   FIG. 5F
 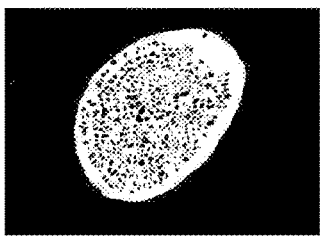 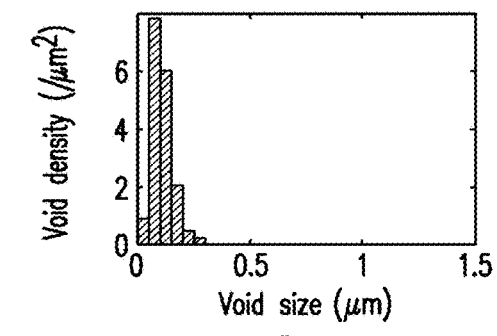
FIG. 5G   FIG. 5H   FIG. 5I

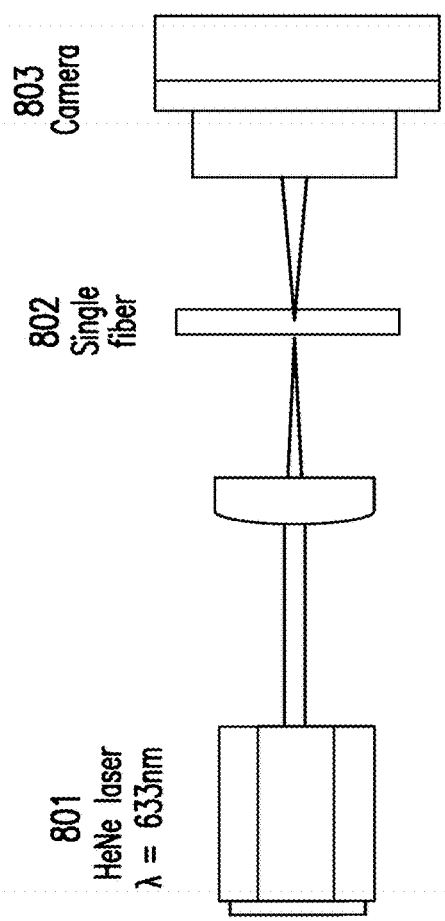
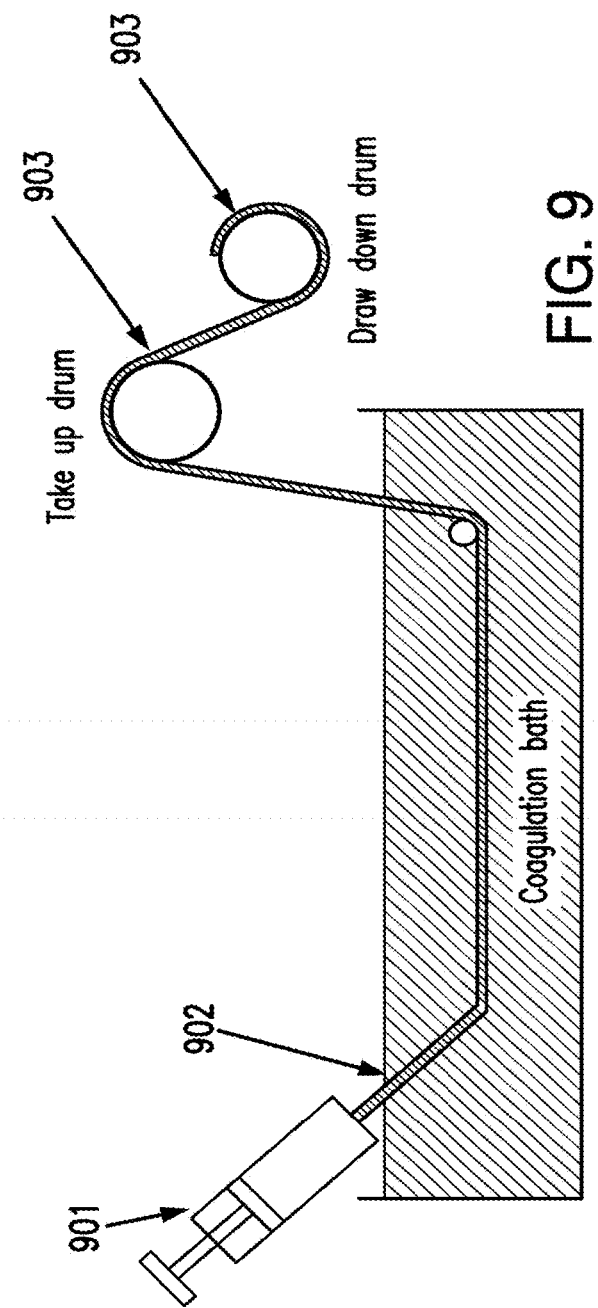

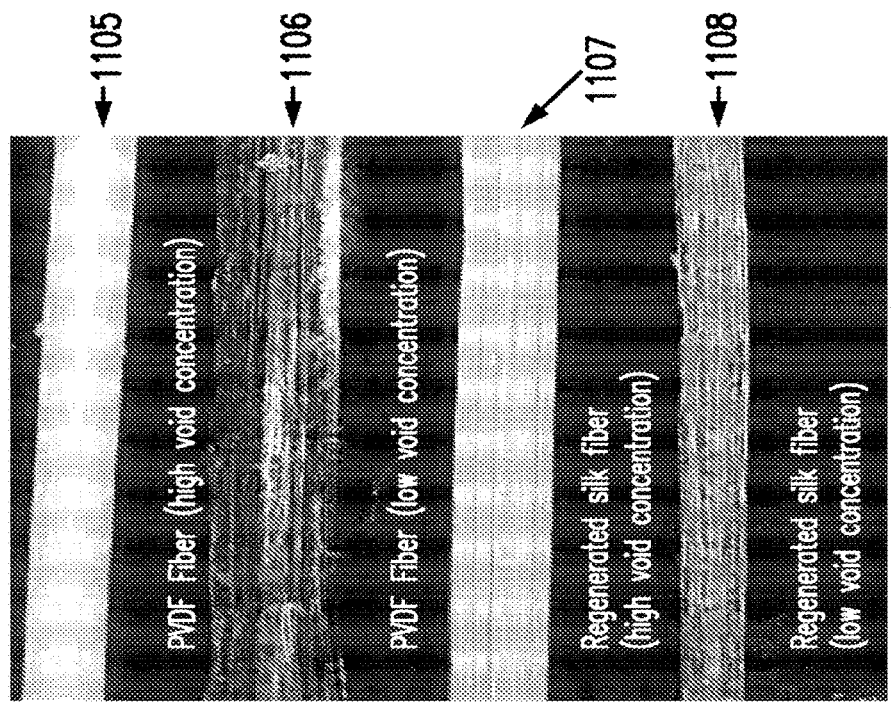
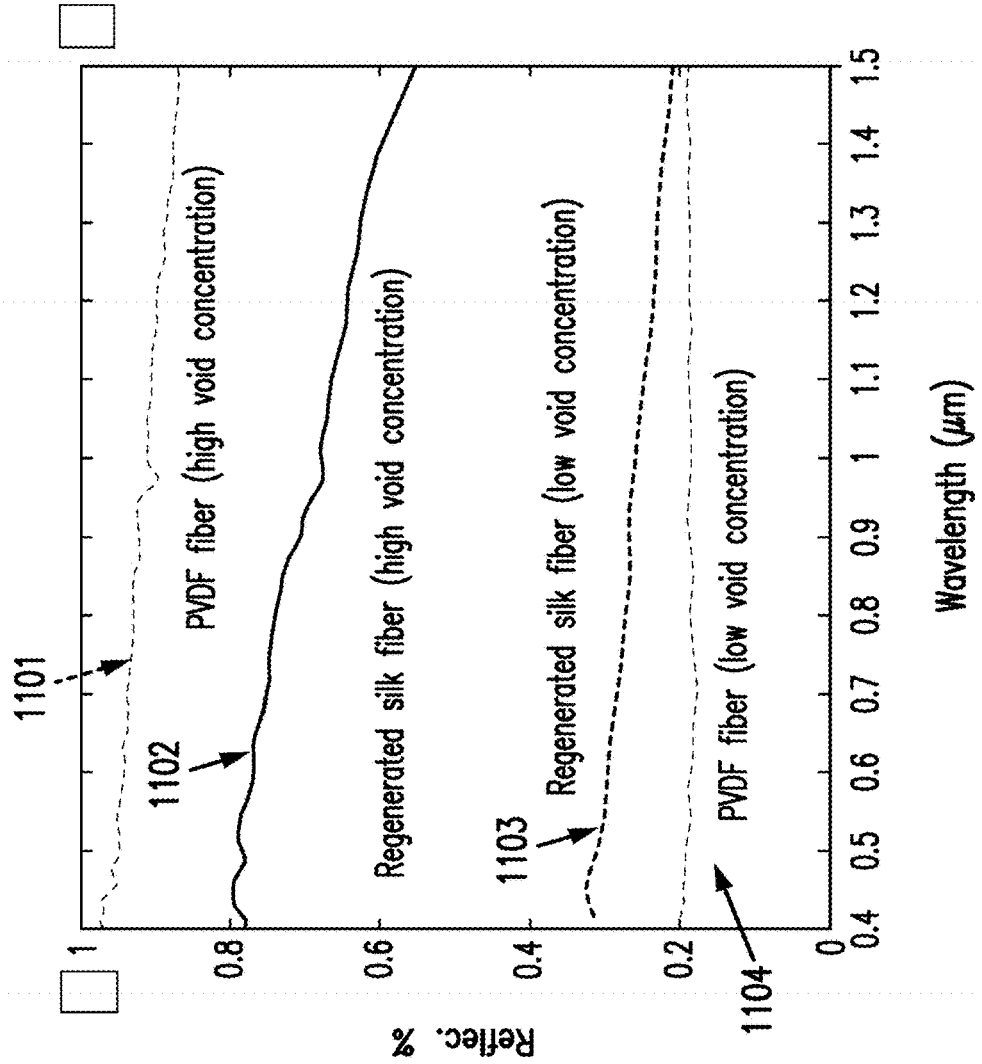
FIG. 11B
FIG. 11A

DEVICES AND METHODS FOR RADIATIVE COOLING

CROSS-REFERENCE TO RELATED APPLICATIONS

This application is a divisional application of U.S. patent application Ser. No. 16/793,668 filed on Feb. 18, 2020, which is a continuation of International Patent Application of International Application No. PCT/US2018/000277 filed on Aug. 15, 2018, which claims priority to U.S. Provisional Application Ser. No. 62/545,909, filed on Aug. 15, 2017, which is incorporated by reference herein in its entirety.

STATEMENT REGARDING FEDERALLY-SPONSORED RESEARCH

This invention was made with government support under grant no. FA9550-14-1-0389 awarded by the Air Force Office of Scientific Research Multidisciplinary University Research Initiative (AFOSR MURI). The government has certain rights in this invention.

BACKGROUND

Certain natural silk fibers can provide radiative cooling properties with enhanced solar reflectivity and thermal emissivity. For example, comet moth cocoon fibers can provide radiative cooling for the moth pupae by controlling optical reflection in the solar spectrum and radiative heat transfer in the mid-infrared. The individual fibers can be reflective/lustrous in the visible spectrum. Nanostructured voids inside the cocoon fiber can provide scattering properties in the visible and near-infrared spectra. These nanostructured voids can scatter sunlight and provide the fibers form birefringence and directional reflectivity.

There remains a need for techniques for fabricating radiative cooling fabrics or fibers having improved optical effects including properties similar to those of comet moth silk fibers, such as the properties described above.

SUMMARY

The presently disclosed subject matter provides systems for radiative cooling and optical waveguiding.

In certain embodiments, an example system for radiative cooling of an object positioned thereunder includes a fabric having one or more fibers extending for a length in a longitudinal direction. The fibers can include void structures. The void structures are positioned within each of the fibers and extended over the length of each fiber. In some embodiments, the void structures can scatter at least a portion of an electromagnetic radiation received thereon to thereby radiatively cool the object.

In certain embodiments, the plurality of void structures can be three-dimensional nanostructured voids. The void structures can have a diameter in a range from about 10 nm to about 10 µm. In some embodiments, the void structures can have a tubular shape. The tubular shaped void structures can scatter incident electromagnetic radiation at a wavelength to a transverse direction of the one or more fibers. The tubular shaped void structures can have a diameter in a range from about 10 nm to about 10 µm, and lengths in a range from 1 µm to 1 meter. In non-limiting embodiments, the void structures can have void structures of the first size positioned in the center region of each fiber, and void structures of the second size positioned in the edge region of each fibers.

In certain embodiments, the fibers can be natural and/or synthetic materials. For example, the fibers can be selected from silk fibroin, cellulose, and combinations thereof. In non-limiting embodiments, the fibers can be selected from nylon, polyester, acrylic, and polyolefin, and combinations thereof. In some embodiments, a diameter of an exemplary fiber can range from 1 µm to 1 mm.

In certain embodiments, the fabric can be woven with the disclosed fibers. In non-limiting embodiments, the fabric can be a non-woven fabric including the disclosed fibers. In some embodiments, the fabric can further include nanoparticles. The nanoparticles can have a width from about 10 nm to 10 µm. The fibers and nanoparticles can have different optical refractive indices. In non-limiting embodiments, the nanoparticles can include one or more of titanium dioxide, silicon nitride, zinc oxide, aluminum oxide, silicon dioxide and barium titanate.

In certain embodiments, an exemplary method for radiative cooling of an object positioned thereunder includes providing a fabric having fibers extending for a length in a longitudinal direction. The fibers can include one or more void structures which are positioned within each of the fibers. The void structures can scatter at least a portion of electromagnetic radiation received thereon to thereby radiatively cool the object. In some embodiments, the method can further include introducing the void structures into each of the fibers through a wet spinning technique. In non-limiting embodiments, the method can further include modifying a direction, a length, a thickness and/or the width of each of void structures to induce optical scattering at a predetermined wavelength.

In certain embodiments, an example optical waveguide can include a synthetic fiber having one or more void structures that confine light in a transverse direction of the synthetic fiber and propagate the light in a longitudinal direction of the synthetic fiber. For example, tubular shaped void structures can be positioned with the synthetic fiber. In non-limiting embodiments, a width of the air voids ranges from about 10 nm to about 10 µm. In some embodiments, the void structures in the optical waveguide can provide transverse Anderson localization.

BRIEF DESCRIPTION OF THE FIGURES

FIG. 1A is an image of a comet moth cocoon, showing its reflective sheen. FIG. 1B is a dark-field optical microscopy image showing overlapping cocoon fibers. FIG. 1C is a scanning electron microscopy (SEM) image of the transverse cross-section of a comet moth silk fiber prepared by focused ion beam (FIB) milling. FIG. 1D is a SEM image of the longitudinal cross-section of a silk fiber prepared by FIB milling.

FIG. 4A is a diagram illustrating an intensity distribution of a beam at λ=600 nm under transverse Anderson localization exiting the end facet of a cocoon fiber measuring ~720 μm in length. FIG. 4B is a diagram illustrating Logarithm of averaged intensity profiles at the exit facet for fibers of different lengths with λ=600 nm. FIG. 4C is a diagram illustrating Logarithm of averaged intensity profiles at the exit facet for a fiber with length L=~720 μm at different wavelengths.

FIGS. 5A, 5D, and 5G are SEM images of (5A) the transverse cross-section of a comet moth fiber, (5D) a regenerated silk fiber, and (5G) a biomimetic PVDF fiber. FIGS. 5B, 5E, and 5H are binarized images of the SEM images outlining voids of (5B) a comet moth fiber, (5E) a regenerated silk fiber, and (5H) a biomimetic PVDF fiber. FIGS. 5C, 5F, and 5I are histograms showing the void size distributions of (5C) a comet moth fiber, (5F) a regenerated silk fiber, and (5I) a biomimetic PVDF fiber.

FIG. 8 is a schematic diagram illustrating the far-field scattering pattern characterization technique.

FIG. 9 is a schematic diagram illustrating the apparatus used for wet spinning of biomimetic fibers.

FIG. 11A is a diagram illustrating integrated hemispherical reflectance in the visible and near-infrared for regenerated silk and PVDF fibers with high and low void concentrations. FIG. 11B is dark field optical microscopy images of regenerated silk and PVDF fibers with high and low void concentrations.

Figure 2A:
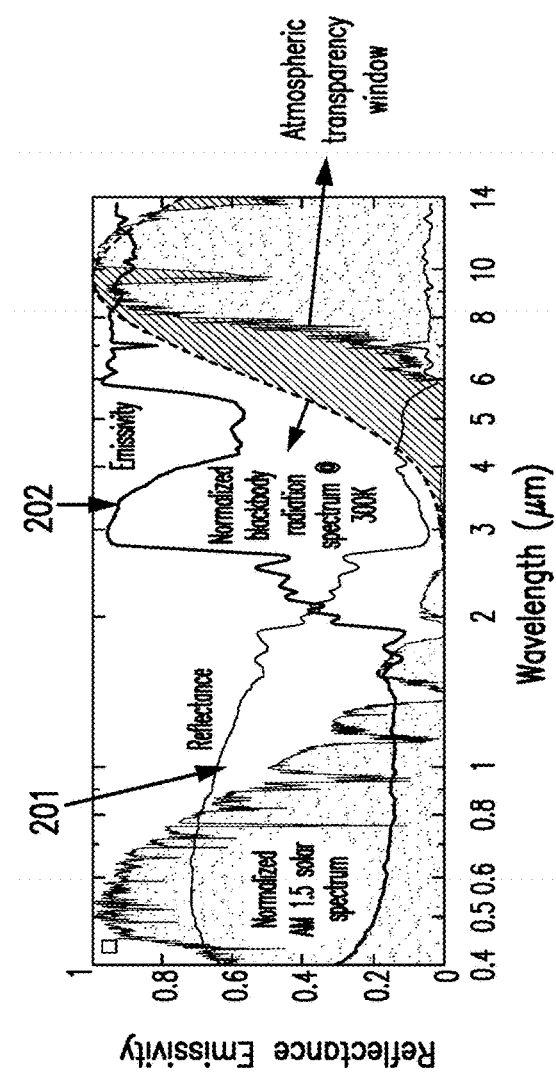
FIG. 2A is a diagram illustrating integrated hemispherical reflectance and emissivity spectra of a single comet moth cocoon fiber from the visible to the mid-infrared.

Throughout the figures, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments.

DETAILED DESCRIPTION

The presently disclosed subject matter provides fiber materials which can include voids or nanoparticles and can act as a radiative cooling element and/or an optical waveguide. The disclosed fiber materials can thus efficiently reflect solar radiation and exhibit enhanced thermal emissivity. For example, an object beneath the fiber materials can stay cool under solar radiation, where the fabric can reduce or minimize absorption of the solar radiation through enhanced solar reflection. In some embodiments, the disclosed fiber materials can allow warm or hot objects to dissipate heat in the form of thermal blackbody radiation into the cooler surrounding environment. In non-limiting embodiments, the disclosed materials can include voids, which can promote directional scattering, giving the materials an improved reflective sheen, or can promote scattering at a particular wavelength of light, giving the materials a structural color. The materials can be used as a biocompatible or bioresorbable material for optical signal and image transport.

In certain aspects, the presently disclosed subject matter provides a system for radiative cooling. The system can include a fabric having one or more fibers and a plurality of void structures. In non-limiting embodiments, the void structures can be air voids.

In certain embodiments, the disclosed system can have an enhanced solar reflectivity. The enhanced solar reflectivity can be due at least in part to void structures inside of the fiber materials. For example, nanostructured voids can backscatter incoming light in the solar spectrum. An exemplary silk fiber generated by the disclosed technique can provide a solar reflectivity of about 0.73 and a thermal emissivity of about 0.90, and nanostructured polyvinylidene difluoride fibers generated by the disclosed technique can provide a solar reflectivity of about 0.93 and a thermal emissivity of about 0.91. By introducing nanostructured voids into fiber materials (for example and without limitation, regenerated silk fibers, fabric woven from regenerated silk fibers), solar reflectivity in the visible and near-infrared spectrum ranges can be enhanced while providing additional properties (for example and without limitation, environmental friendly, bio-compatible, soft and comfortable fabric, air permeability, and mechanical strength).

In certain embodiments, the disclosed void structure can be a three-dimensional (3D) nanostructured void. The 3D nanostructured void can extend a length in a longitudinal direction of the fiber material. For example, the introduced nanostructured air voids can have a tubular shape and run along the longitudinal direction of the fiber. The tubular shaped air voids can reflect or scatter an incoming light to a transverse direction of the tubular shaped air voids and confine the reflected or scattered light to a narrow band defined by the orientation of the tubular voids with respect to the incident light. The resulting fibers can possess a metallic sheen due to this directional reflection or scattering of light.

In certain embodiments, the void structure of the present disclosure can have a size which can be comparable with visible and near-infrared wavelengths. For example, and not by way of limitation, the 3D particulate void structure can have a size from about 10 nanometer (nm) to about 10 lam. For example, and not by way of limitation, the void structure can have a diameter from about 10 nm to about 5 μm, from about 10 nm to about 1 μm, from about 10 nm to about 500 nm, from about 10 nm to about 100 nm, from about 10 nm to about 50 nm, from about 50 nm to about 10 μm, from about 100 nm to about 10 lam, from about 500 nm to about 10 lam, from about 1 μm to about 10 μm, or from about 5 μm to about 10 μm. In some embodiments, the void structure can have a length from about 1 μm to about 1 meter (m). For example, and not by way of limitation, the void structure can have a length from about 1 μm to about 500 centimeter (cm), from about 1 μm to about 250 cm, from about 1 μm to about 100 cm, from about 1 μm to about 50 cm, from about 1 μm to about 10 cm, from about 1 μm to about 1 cm, about 1 cm to about 1 m, about 10 cm to about 1 m, about 100 cm to about 1 m, about 250 cm to about 1 m, or about 500 cm to about 1 m.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

In certain embodiments, the reflectivity can be adjusted by modifying a geometry of the void structures. In some embodiments, the size of the plurality of void structures in a center region of the fiber can be different from a size of the plurality of void structures in an edge region of the fiber. For example, to increase a reflectivity of the disclosed system, void structures having a wider diameter can be introduced into a center region of the fiber and void structures having a smaller diameter can be introduced into an edge region of the fiber. In non-limiting embodiments, to decrease a reflectivity of the system, void structures having a smaller diameter can be introduced into a center region of the fiber and void structures having a wider diameter can be introduced into an edge region of the fiber. In some embodiments, the edge regions can be a marginal area of the fiber materials and the center area can be an area other than the edge region. In some embodiments, the edge region can be about 1/10 of the diameter of the fiber material. Alternatively, the edge region can be about 1/15, 1/20, 1/30, 1/40, 1/50, 1/100, 1/200, 1/300, 1/400, 1/500, 1/600, 1/700, 1/800, 1/900, or 1/1000 of the diameter of the fiber material.

In certain embodiments, the disclosed system can include a plurality of nanoparticles. Each of nanoparticles can have a different optical refractive index from the fiber materials to achieve radiative cooling properties. In a non-limiting embodiment, the void structure can be filled with the nanoparticles and/or be replaced with the nanoparticles, and the one or more fibers and the plurality of nanoparticles can have different a different optical refractive index. In some embodiments, the nanoparticles can have a size which can be comparable with visible and near-infrared wavelengths. For example, the void structure can have a diameter from about 10 nanometers (nm) to about 10 lam; the nanoparticles can have a diameter from about 10 nm to about 5 μm, from about 10 nm to about 1 μm, from about 10 nm to about 500 nm, from about 10 nm to about 100 nm, from about 10 nm to about 50 nm, from about 50 nm to about 10 lam, from about 100 nm to about 10 lam, from about 500 nm to about 10 lam, from about 1 μm to about 10 μm, or from about 5 μm to about 10 μm. In some embodiments, the nanoparticles can include titanium dioxide, silicon nitride, zinc oxide, aluminum oxide, silicon dioxide, and/or barium titanate.

In certain embodiments, the system can have a structural color which can be originated from interactions between light and void structures. The dimension of the disclosed void structures can be modified such that optical scattering can occur at predetermined wavelengths and bands of visible light. For example, the void structures filled with 50-nm diameter $TiO_2$ spherical nanoparticles can backscatter UV and blue light, and therefore, induce blue color. Likewise, 100-nm $TiO_2$ particles can induce blue-green, 150-nm $TiO_2$ particles induce green; and $TiO_2$ particles larger than 400 nm can enhance reflection of near-infrared component of sunlight. In non-limiting embodiments, the disclosed coloration can be used to create desired colors for any fabric/fiber materials without using dyes.

Various types of fiber materials can be used for the disclosed system. Natural fiber materials can be used for the disclosed radiative cooling system and optical waveguide system. For example, the natural fiber materials can include regenerated silk fibroin, cellulose, or combinations thereof. In non-limiting embodiments, synthetic fiber can be used for the disclosed radiative cooling system and optical waveguide system. The synthetic fiber materials can include nylon, polyester, acrylic, polyvinylidene difluoride (PVDF) and polyolefin, and combinations thereof. In some embodiments, a fabric can be woven with the one or more natural and/or synthetic fibers. In non-limiting embodiments, the natural or synthetic fibers can be included in a non-woven fabric. The woven or non-woven fabrics can be utilized in the disclosed radiative cooling system and optical waveguide system.

In some embodiments, the fiber materials can have a tubular shape or a triangular shape. In certain embodiments, the fiber materials can have a diameter from about 1 micrometer (μm) to about 1000 μm. For example, and not limitation, the void structure can have a thickness from about 1 μm to about 900 μm, from about 1 μm to about 800 μm, from about 1 μm to about 700 μm, from about 1 μm to about 600 μm, from about 1 μm to about 500 μm, from about 1 µm to about 400 µm, from about 1 µm to about 300 µm, from about 1 µm to about 200 µm, from about 1 µm to about 100 µm, from about 1 µm to about 75 µm, from about 1 µm to about 50 µm, from about 1 µm to about 25 µm, from about 20 µm to about 900 µm, from about 75 µm to about 900 µm, from about 100 µm to about 900 µm, from about 200 µm to about 900 µm, from about 300 µm to about 900 µm, from about 400 µm to about 900 µm, from about 500 µm to about 900 µm, from about 600 µm to about 900 µm, from about 700 µm to about 900 µm or from about 800 µm to about 900 µm. In some embodiments, the fiber materials can have a diameter from about 20 µm to about 120 µm.

In certain embodiments, the disclosed subject matter can provide an optical waveguide system. The optical waveguide can include at least one synthetic fiber having at least one void structure. The void structure can confine a light in a transverse direction of the synthetic fiber and propagate the light in a longitudinal direction of the synthetic fiber.

In certain embodiment, the synthetic fiber can include the disclosed void structures. For example, the synthetic fiber can include a plurality of tubular voids. The sideway spreading of the guided optical modes can be suppressed by scattering at the tubular voids that are aligned with the fibers. In non-limiting embodiments, the tubular void structure can have a diameter comparable with visible and near-infrared wavelengths. For example, the tubular void structure can have a diameter from about 10 nanometers (nm) to about 10 µm. For example, and not by way of limitation, the tubular void structure can have a size from about 10 nanometer (nm) to about 10 µm. For example, and not by way of limitation, the tubular void structure can have a diameter from about 10 nm to about 5 µm, from about 10 nm to about 1 µm, from about 10 nm to about 500 nm, from about 10 nm to about 100 nm, from about 10 nm to about 50 nm, from about 50 nm to about 10 µm, from about 100 nm to about 10 µm, from about 500 nm to about 10 µm, from about 1 µm to about 10 µm, or from about 5 µm to about 10 µm. In some embodiments, the tubular void structure can have a length from about 1 µm to about 1 meter (m). For example, and not by way of limitation, the void structure can have a length from about 1 µm to about 500 centimeter (cm), from about 1 µm to about 250 cm, from about 1 µm to about 100 cm, from about 1 µm to about 50 cm, from about 1 µm to about 10 cm, from about 1 µm to about 1 cm, about 1 cm to about 1 m, about 10 cm to about 1 m, about 100 cm to about 1 m, about 250 cm to about 1 m, or about 500 cm to about 1 m.

In certain embodiments, the disclosed system can provide transverse Anderson localization in the natural and synthetic fiber materials. Anderson localization refers to a strong localization of the light without diffusion of waves in a disordered medium. For example, the disclosed system can confine light with decreased transverse size (e.g., 5 µm) and propagate the light along the fibers in longitudinal direction. In non-limiting embodiments, the disclosed fibers can be used to deliver light and transport information and images in the form of optical signals.

The disclosed subject matter also provides methods for introducing the void structures into the fiber materials. A wet spinning procedure can be used for fabrication of biocompatible fibers using natural and/or synthetic fibers. For example and not limitation, one exemplary natural material, such as regenerated silk fibroin from the domestic silk moth (*Bombyx mori*), can be selected. A solution of lithium bromide (LiBr) can be used to dissolve the silk fibers to generate a fibroin-LiBr solution. The fibroin-LiBr solution can be dissolved in an oven and transferred to a dialysis cassette with deionized water. Certain impurities remaining in the solution can be removed using a centrifuge. Optionally, the fibroin-LiBr solution can be further concentrated with a second set of dialysis cassettes, where the solution can be dialyzed against a polyethylene glycol solution to achieve the desired concentrations (e.g., 12-18%).

In non-limiting embodiments, synthetic fibers (e.g., PVDF) can be prepared by dissolving synthetic materials (e.g., Poly (vinylidene fluoride-co-hexafluoropropylene)) in Dimethylacetamide (DMA). Both silk fibroin and PVDF biomimetic fibers can be fabricated using wet spinning. In the case of regenerated silk fibers, ammonium sulfate solution can be used as the coagulant, while in the case of PVDF fibers, deionized water can be used as the coagulant. A syringe pump can be used to extrude the solutions. As the solution entered the coagulation bath, phase separation and polymer precipitation can occur, where a polymer lean phase and a polymer rich phase can be generated in the fiber. The portion of the fiber with polymer lean phase can become the void structures. These solidified porous fibers can be spun onto a motorized drum at a controlled speed to achieve the desired fiber diameters. The aspect ratio of the voids can be modified through a draw-down process using a second motorized drum at a higher speed compared to the first drum, where a certain degree of elongation of the voids can be achieved inside the fiber. For example, void structures can be elongated in a range from about 1 µm to 1 meter over the lengths of the fiber. In certain embodiments, the disclosed modified wet spinning technique can be a less expensive alternative approach to fabricating optical fibers supporting guided modes that can be localized in the fiber transverse cross-section.

In certain embodiments, the disclosed system can be as a versatile photonic platform. In non-limiting embodiments, the disclosed subject matter can provide a radiative cooling system. The radiative cooling system can allow a subject to cool down under direct solar radiation when fabric and body are in direct thermal contact. The radiative cooling system can be a comport and environmentally friendly system, as the material can be biocompatible/biodegradable materials. In some embodiments, the disclosed subject matter can provide a waveguide system using transverse Anderson localization. The waveguide system can transport information and images in the form of optical signals, for example when it is desirable for the fiber to be biocompatible and bioresorbable. Such radiative cooling and waveguide systems can have structural colors which can resist fading and can provide less toxic and dye-free colorization.

EXAMPLES

The following Examples are offered to more fully illustrate the disclosure but are not to be construed as limiting the scope thereof.

Example 1: Nanostructured Fibers as a Versatile Photonic Platform Radiative Cooling and Waveguiding Through Transverse Anderson Localization This example illustrates filamentary air voids which can promote directional scattering, giving the fibers a reflective sheen. Furthermore, the voids can be used to guide optical modes to propagate along the fibers through transverse Anderson localization.

Materials and Methods

For the visible and near-infrared portion of the spectrum, reflection and transmission measurements were carried out using a Fourier transform-based spectrometer (Bruker Vertex 80) equipped with a laser-stabilized high-brightness xenon plasma light source (Energetic eq-99). Forward and backward scattered light was captured with a 2-inch visible/near-infrared integrating sphere (Thorlabs IS200-4), coupled with a set of silicon and indium gallium arsenide detectors. The integrating sphere wall material was used to calibrate the measurements. For the measurements in the mid-infrared portion of the spectrum, a Fourier transform infrared spectrometer (Bruker Vertex 70v), a 2-inch integrating sphere (Labsphere Model 4P-GPS-020-SL) coated with diffuse gold reflectors and a mercury cadmium telluride detector were used.

Morphology and Optical Properties of Comet Moth Fibers

The comet moth cocoon is made of threads, each having a pair of fibers bonded by a coating of sericin. Focused ion beam (FIB) milling was used to expose the fiber's transverse and longitudinal cross-sections. The transverse cross-section of one fiber (FIG. 1C) shows that it has a diameter of ~40 µm and is populated with irregularly shaped voids with sizes ranging from hundreds of nanometers to one micron. Small voids tend to be located toward the edge of the fiber and large voids toward the center. The region where sericin joins the two fibers is free of voids. The longitudinal cross-section of a fiber (FIG. 1D) shows that the voids propagate for at least tens of microns without varying in size.

Directional-hemispherical reflectance measurements performed on single silk fibers measuring ~50 µm thick show that single fibers have a high reflectance of 0.66 normalized to the solar spectrum (FIG. 2A). The FIG. 2A shows a reflectance plot 201 and emissivity plot 202 of the exemplary fiber over the wavelengths of light. The fibers' reflectance enhancement is the result of multiple light-scattering events caused by the random voids inside the fibers, where the void sizes are comparable to the wavelengths of sunlight. At longer wavelengths, however, as the voids become sub-wavelength in size, they no longer act as strong scattering centers, and reflectance is greatly reduced. In fact, the fibers become absorptive (i.e., reflectance is lower than 0.2) in the mid-infrared range ($\lambda$=6-14 µm) due to strong and broadband absorption of a variety of chemical bonds of fibroin proteins that comprise the silk fibers. The wavelength range over which infrared absorptivity is enhanced overlaps well with the atmospheric transparency window ($\lambda$=8-14 µm) and the blackbody radiation spectrum of warm objects. Enhanced absorptivity in the mid-infrared enable the cocoon fibers to reach a high emissivity of 0.88, weighted by the thermal radiation spectrum at 300 K. Thus, the portion of solar energy absorbed by the cocoon can be dissipated back to the environment through thermal radiation. The combined effects of improved solar reflectance and thermal emissivity help prevent the pupa inside a cocoon from overheating when the cocoon is under direct sunlight.

Figure 2B:
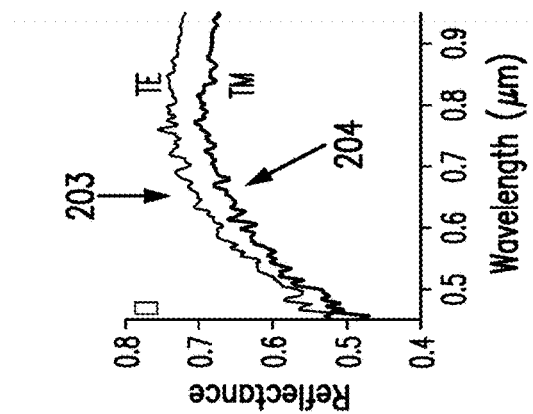
FIG. 2B is a diagram illustrating integrated hemispherical reflectance spectra of a single cocoon fiber illuminated with transverse electric (TE) and transverse magnetic (TM) polarized light at normal incidence.

To further understand how these filamentary voids, affect the optical properties of the fibers and to understand the specular reflection of these fibers in the visible, linearly polarized light was shone onto single silk fibers and spatial, spectral, temporal, and polarization-dependent properties of scattered light were measured. The integrated reflectance of the silk fiber was higher when illuminated with transverse electric 203 (TE) polarized light than when illuminated with transverse magnetic 204 (TM) polarized light (FIG. 2B). Here, TE 203 corresponds to the electric field parallel to the longitudinal direction of the fiber.

Figure 2C:
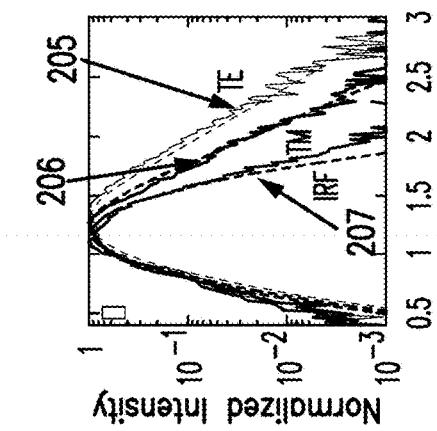
FIG. 2C is a diagram illustrating time-of-flight measurements of a single cocoon fiber.
Figure 2D:
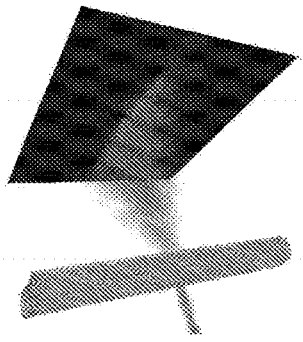
FIG. 2D is a schematic diagram illustrating a focused laser beam passing through a single cocoon fiber oriented in the vertical direction.
Figure 2E:
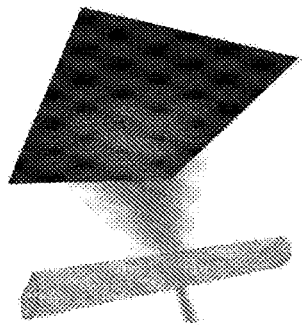
FIG. 2E is a schematic diagram illustrating the focused laser beam passing through a regenerated silk fiber bundle (as a control) containing a high density of nanoscale particulate voids.

This difference in reflectivity can be the result of a form birefringence created by the filamentary voids, as confirmed through finite-difference time-domain (FDTD) simulations. These filamentary voids also enable the silk fibers to exhibit a specular sheen as shown in FIG. 1A: the 1D nature of these voids limits the scattered light to within a narrow angular range in the far field. The effect was demonstrated by imaging the forward scattering pattern of a laser beam at $\lambda$=633 nm focused onto a single fiber. FIG. 2D shows that the far-field scattering pattern of a single cocoon fiber is a narrow horizontal stripe perpendicular to the vertically oriented fiber, indicating highly directional scattering as a result of the filamentary voids. By contrast, a regenerated silk fiber of similar width and thickness but filled with three-dimensional (3D) voids produces a diffuse scattering pattern with no preferential scattering direction (FIG. 2E).

Figure 6C:
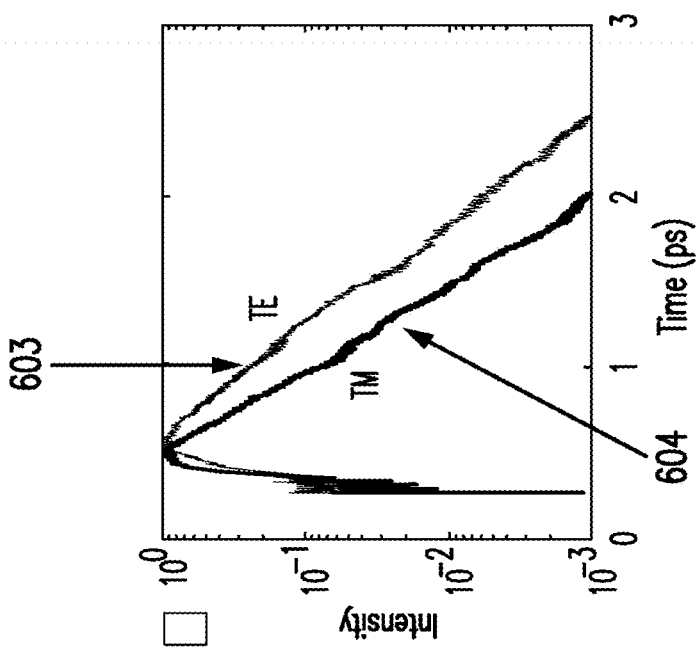
FIG. 6C is a diagram illustrating simulated temporal profiles of an ultrashort pulse with TE 603 and TM polarizations 604 passing through a single cocoon fiber.

The scattering strength of these fibers can be quantified by a cross-correlation measurement technique. The temporal profile of an ultrashort laser pulse at $\lambda$=600 nm was measured before and after it passed through a single cocoon fiber along the transverse direction (FIG. 2C). The temporal profile before passing through the cocoon fiber was used as the instrument response function 207 (IRF). The IRF was convolved with an exponential decay function to fit and extract the photon lifetime, which positively correlates with the strength of light scattering inside the random structures of the cocoon fiber. The measured photon lifetime was 210 fs for TE polarized light 205 and 155 fs for TM polarized light 206. The results agree qualitatively with the polarization-dependent reflectance measurements (FIG. 2B) and FDTD simulation results (FIG. 6C), which show that TE polarized light 603 interacts more strongly with the filamentary voids than does TM polarized light 604.

Regenerated Silk and PVDF Biomimetic Fibers for Radiative Cooling

In this example, fibers of the comet moth were shown to possess passive radiative-cooling capabilities. The capabilities, however, are limited by materials absorption in the solar spectrum and the density of voids (FIG. 2A). Drawing inspiration from the natural silk fibers, alternative materials and fiber-pulling techniques were used to create biomimetic fibers with improved radiative-cooling capabilities.

Figure 3A:
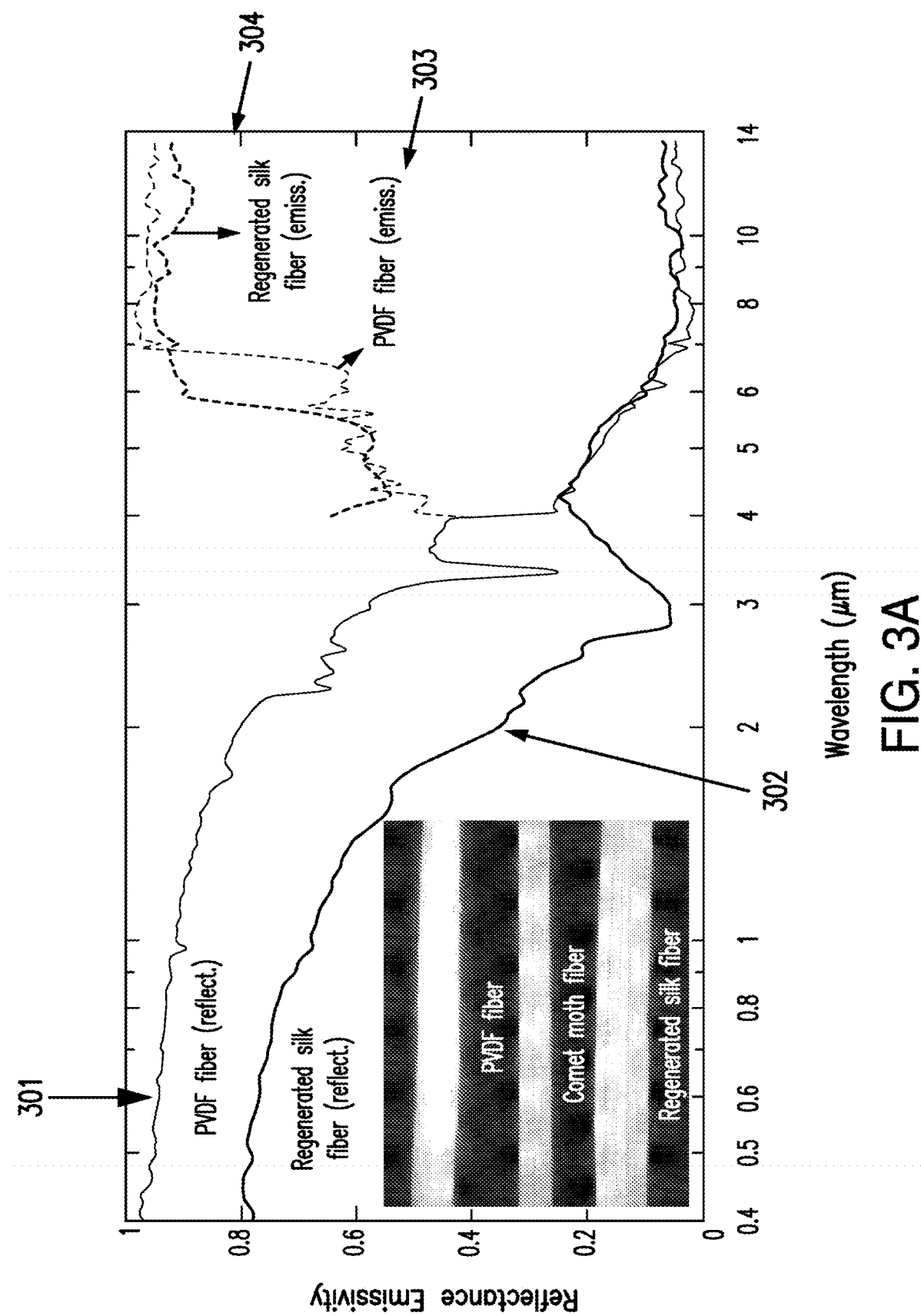
FIG. 3A is a diagram illustrating integrated hemispherical reflectance and emissivity spectra of a ~100-μm-thick bundle of regenerated silk fibers and a single PVDF fiber measuring ~100 μm in diameter from the visible to the mid-infrared region.
Figure 3B:
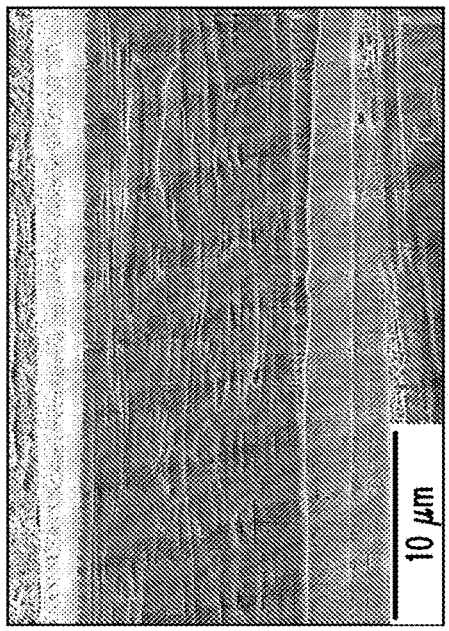
FIGS. 3B and 3C are SEM images of transverse and longitudinal cross-sections, respectively, of a regenerated silk fiber containing voids.
Figure 3C:
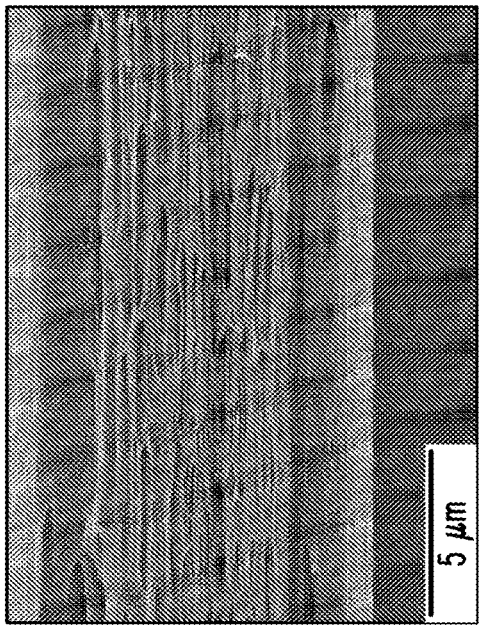

Regenerated silk fibroin was obtained from cocoons made by the domestic silk moth, Bombyx mori. By chemically removing sericin, regenerated fibroin offers substantially reduced absorption in the visible and near-infrared part of the solar spectrum, while providing absorption properties similar to those of natural silk fibers in the mid-infrared region. Fibers were extruded through wet spinning from a solution of regenerated fibroin and have shown a greater tensile strength than do natural Bombyx mori fibers. The fiber spinning recipes was further modified, in particular, the concentrations of the silk fibroin solution and the coagulation bath, to introduce voids inside the wet-spun fibers and to control their density (FIG. 3B). A silk fibroin concentration of 13.9% yields the highest density of voids. The regenerated silk fibroin fibers were first spun onto a motorized drum at a controlled speed to achieve a thickness of a few tens of microns. The voids were then stretched into a filamentary form (FIG. 3C) through a drawing process by a second motorized drum rotating two to four times faster than the first one. Spectral measurements of ~100-µm-thick bundles of regenerated silk fibers with a high density of voids (e.g., more than about 2.2 voids/µm$^2$) showed that the fiber bundle had an integrated solar reflectance of 0.73 and an integrated thermal emissivity of 0.90 (FIG. 3A). FIG. 3A provides a solar reflectance plot 301 and an integrated thermal emissivity plot 303 of an exemplary PVDF fiber.

FIG. 3A also provides a solar reflectance plot 302 and an integrated thermal emissivity plot 304 of an exemplary regenerated silk fiber.

Figure 3D:
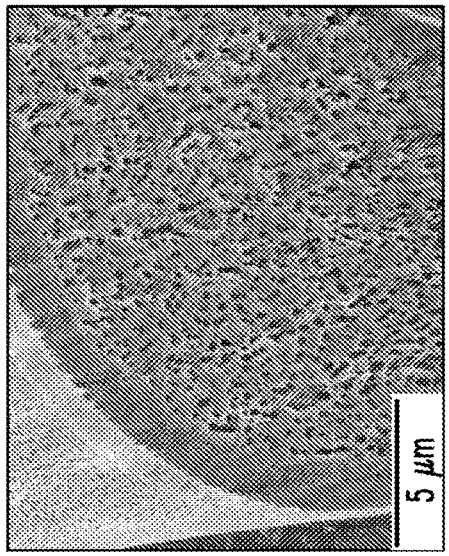
FIGS. 3D and 3E are SEM images of transverse and longitudinal cross-sections, respectively, of a PVDF fiber containing voids.
Figure 3E:
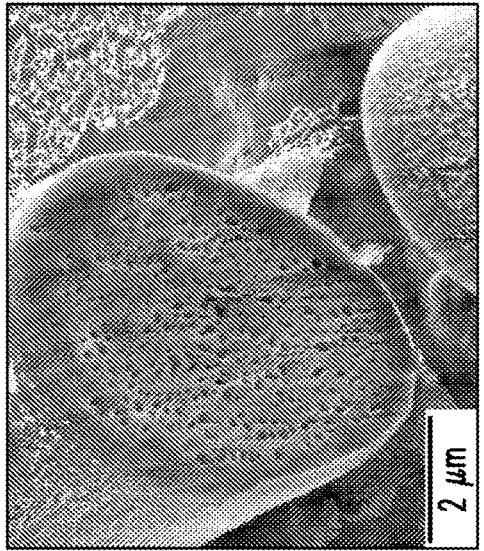

While the fibers made from regenerated fibroin provide good optical properties, silk fibroin's proneness to long-term UV radiation, water and heat damage and its cost as a raw material limit its applications in radiative-cooling applications. A widely available thermoplastic, polyvinylidene difluoride (PVDF), which is highly resistant to UV radiation, heat and water damage and exhibits low absorption in the solar spectrum, was employed as an alternative material. By properly choosing the solvent, the ratio between PVDF and the solvent, and the coagulation bath, PVDF fibers containing 3D voids were pulled (FIG. 3D). A similar drawing process was used to stretch the voids into a filamentary form (FIG. 3E). Optical measurements performed on pre-drawn thicker fibers, ~100 µm in diameter, showed that the fibers had a high solar reflectance of 0.93 and a high thermal emissivity of 0.91 (FIG. 3A). The regenerated silk and PVDF biomimetic fibers exhibited improved solar reflectance compared with the comet moth fiber; this enhancement is primarily due to the higher density of voids created in the biomimetic fibers (i.e., 5.5 voids/µm² for the regenerated silk fiber, 17 voids/µm² for the PVDF fiber, and 2.2 voids/µm² for the comet moth fiber; FIG. 5).

A comparison was made between the solar reflectance spectra of regenerated silk and PVDF fibers with low and high void concentrations (FIG. 11), which further confirmed that the high solar reflectance observed in these fibers was the result of a high density of voids. The filamentary voids in the biomimetic fibers were not as long as those observed in the cocoon fibers made by the comet moth. The natural silk fibers' ability to maintain longitudinal invariance motivated us to investigate light propagation along these nanostructured fibers confined by strong light scattering in the transverse direction.

Transverse Anderson Localization in Comet Moth Fibers

Anderson localization in 3D systems requires a critical level of scattering strength, quantified by the Ioffe-Regel criterion, which can be satisfied in high-refractive-index contrast materials systems. However, the scaling theory of localization dictates that Anderson localization will always occur in random two-dimensional coupled waveguide arrays, even for low-refractive-index contrast systems. In the case of transverse Anderson localization, a beam first undergoes diffusive broadening as it propagates along the longitudinal direction of the waveguide array but ultimately reaches a mean localization radius, called the localization length $\xi$, as it propagates further down the array. The onset of transverse localization can be characterized by the exponentially decaying tail of the beam's transverse intensity profile. The localization length $\xi$ of a guided light beam and the mean free path l* of photons propagating in the nanostructured fibers can be estimated by using the following equations:

$$I \sim \exp(-2|r|/\xi) \quad (1)$$

$$\xi = l^* \exp(\pi k_\perp l^{*2}/2) \quad (2)$$

where I is the beam intensity profile, r is the distance from the beam center, $k_\perp = 2/\omega_o$ is the transverse wavenumber, and $\omega_o$ is the initial width of the beam at the entrance facet of the fiber.

To characterize how a light beam broadens and ultimately reaches full confinement as a result of transverse Anderson localization in comet moth fibers. A set of fiber segments with different lengths (L=300, 400, 720, and 1500 µm) were cut and the facets polished using FIB milling. All fiber segments were from the same fiber and cut next to one another to minimize variations in their cross-sectional void pattern. A high-numerical-aperture (NA=0.55) objective was used to launch a focused beam toward one facet of a fiber segment, and the exit facet was imaged with a matching objective to characterize the beam upon exiting the segment.

Figures 4D, 4E, 4F:
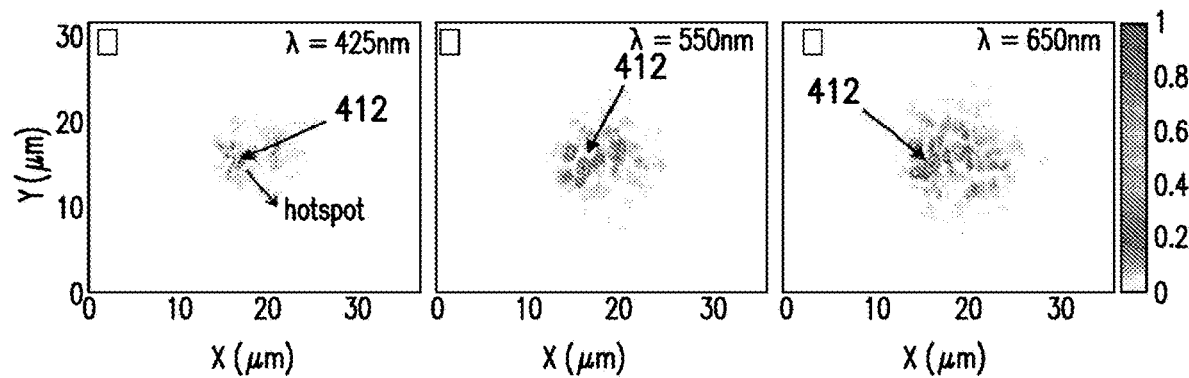
FIGS. 4D-4F are diagrams illustrating intensity distributions showing a localized hotspot in a fiber with length L=~150 μm at three wavelengths.
Figure 4G:
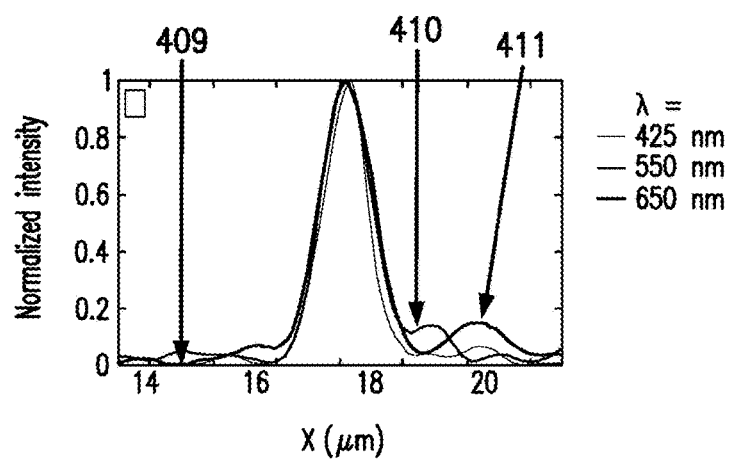
FIG. 4G is a diagram illustrating profiles of the hotspot at the three wavelengths.

FIG. 4A shows the intensity distribution at the exit facet of a fiber segment (L=720 µm, λ=600 nm). The curve in FIG. 4A shows the logarithm of the average intensity profile through the center of the beam, and its linear slopes are an indication of transverse Anderson localization. The intensity profiles for the four fiber segments 401, 402, 403, and 404 (length L=300, 400, 720, and 1500 µm, respectively) are shown FIG. 4B. Plots 401, 402, 403, 404 of four fiber segments with length L=300, 400, 720, and 1500 µm show the evolution of the beam profile from initial diffusive broadening to eventual full confinement as L increases. FIG. 4C shows the intensity profiles for the fiber segment with L=720 µm at various wavelengths 405, 406, 407, 408 (λ=450, 500, 600, and 700 nm, respectively). The figure shows that, while the beam remains localized with increasing wavelength (at least up to λ=850 nm), the localization length $\xi$ increases with wavelength. The localization length $\xi$ of the fiber at λ=600 nm, for example, can be estimated by fitting the exponentially decaying tail of the intensity profile with Equation (1), yielding $\xi$=4.6 µm. The mean free path l* at λ=600 nm can be calculated using Equation (2), where the entrance beam size $\omega_o$ is ~2 µm, yielding l*~0.98 µm, which is smaller than the sizes reported in certain demonstrations of transverse Anderson localization with low-refractive-index contrast systems.

Figure 4J:
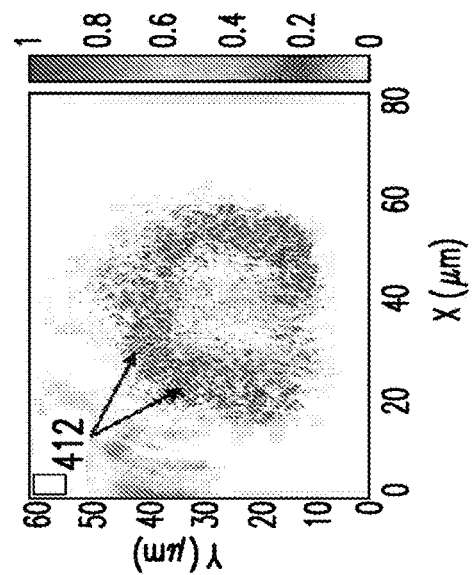
FIG. 4J is a diagram illustrating intensity distributions at the exit facet of the fiber showing the transport of the ring pattern.
Figure 4I:
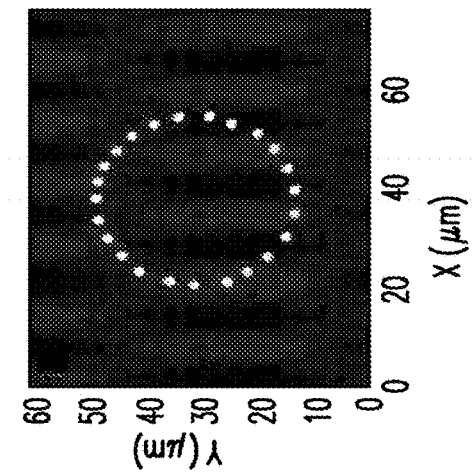
FIG. 4I is an optical image of a ring of 1-μm apertures used for image transport through a cocoon fiber with length L=~400 μm.

The small localization length compared with the transverse size of the fibers enables the fiber system to transport simple patterns. FIG. 4I shows an optical image of a series of apertures measuring 1 µm in diameter, milled using FIB in a gold thin film and forming a 30-µm-diameter ring. The aperture pattern was butt coupled to the entrance facet of a fiber segment of length 400 µm and illuminated with a large-diameter beam at λ=600 nm. The image at the exit facet of the fiber segment (FIG. 4J) is a discernible ring pattern, with a resolution limited by the localization length of the system.

Figure 4H:
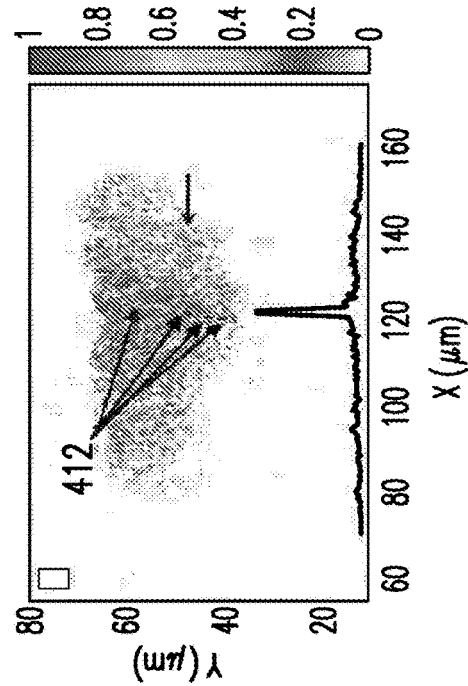
FIG. 4H is a diagram illustrating intensity distribution showing light being guided by a sericin slab region between two cocoon fibers.

As the position of the fiber facet moves with respect to the input beam, light can sometimes be tightly confined in certain regions of the fiber that are free of voids and surrounded by a high density of scattering centers. FIGS. 4D-4G show the confined hotspots 412 at various wavelength (λ=425, 550, and 650 nm), where the confinement is maintained as the wavelength varies from 425 to 650 nm. Plots indicating normalized intensity of the hot spots at various wavelengths 405, 410, and 411 (λ=425, 550, and 650 nm, respectively). The full-width at half-maximum (FWHM) sizes of the hotspot at λ=425, 550, and 650 nm are 0.75, 0.94, and 1 µm, respectively, which are smaller than the spot size of the entrance beam (~2 µm). The focusing abilities of the cocoon fibers have the potential to be further enhanced through wavefront shaping and optimization with adaptive optics. In addition to waveguiding through transverse Anderson localization, FIG. 4H shows that these silk fibers can also act as a slab waveguide: the central sericin region free of voids can act as a waveguide core, and lateral confinement is provided by scattering centers in the fibers.

The silk materials exhibit intrinsic absorption in the visible spectrum (sericin being more absorptive than fibroin at shorter wavelengths) and that the filamentary voids in fact slowly morph along the longitudinal direction. Consequently, certain optical properties and potential applications discussed above related to transverse Anderson localization cannot be realized in fibers longer than a few millimeters. Reduction in propagation losses, however, can be achieved by chemically removing the sericin coating surrounding silk fibers.

The optical properties of nanostructured silk fibers of the comet moth are now described. The one-dimensional nature of these voids and their scattering strength through polarization-dependent reflectance measurements, time-of-flight measurements, and far-field scattering measurements were shown. The silk fibers exhibit radiative-cooling capabilities; spectroscopic studies shown in FIGS. 2 and 3 show that improved back-scattering of the nanostructured voids in the visible and near-infrared regions enhances solar reflectance and intrinsic materials absorption of fibroin in the mid-infrared region enhances thermal emissivity. Drawing inspiration from the natural system, biomimetic fibers were spin using regenerated silk fibroin and PVDF, and showed that they possess exceptional optical properties for radiative-cooling applications. Furthermore, transverse Anderson localization in a natural biological fiber system was shown: confined waveguide modes with localization length as small as =4.6 µm can propagate along silk fibers of the comet moth, and waveguiding is enabled by strong light scattering in the transverse direction. These silk fibers have the potential to be used for delivering light and transporting images in situations in which the fiber must be biocompatible and bioresorbable. The disclosed subject matter provided methods for creating silks with filamentary voids and emulating the process to create bioinspired fibers with longitudinally invariant voids.

Example 2: Methods for Producing Nanostructured Fibers as a Versatile Photonic Platform and Characterization of the Fibers This Example illustrates methods for creating nanostructured fibers which include filamentary air voids and characteristics of the fiber.

Focused Ion Beam Milling of Nanostructured Fibers

The cross-sectional images of the natural and manmade fibers were obtained with a focused ion beam/scanning electron microscopy dual system (FEI Helios NanoLab DualBeam). A layer of 500-nm Platinum was deposited on top of a fiber at the position of the cross-sectional cut to protect the fiber from milling-induced damages. A high current ion beam (Ga+, 30 KV, 21 nA) was then used to cut through the fiber and expose its cross-section, followed by using a smaller current ion beam (30 kV, 2.8 nA) to polish the cross-sectional surfaces. Similar ion beam milling conditions were used to prepare the end facets of cocoon fibers for transverse Anderson localization experiments. Platinum protective coating was not used in this case.

Void Size, Density and Distribution

Cross-sectional scanning electron microscopy (SEM) images of the comet moth fibers were binarized by utilizing the image contrast between the voids and the surrounding solid fibroin regions (FIG. 5B). Image processing software, ImageJ, was then used to obtain the sizes of all the voids inside the fiber. The histogram of void sizes is shown in FIG. 5C. The diameters of the voids are shown to range from a few tens of nanometers to about a micron. The average void size is 236 nm, the void density is 2.2 voids/µm$^2$, and the air-void filling fraction is 9.8% for this particular fiber. Similar processing techniques were used in the case of biomimetic regenerated silk and PVDF fibers, where the average void diameter is 145 nm and 106 nm, the void density is 5.5 and 17 voids/µm$^2$, and the air-void filling fraction is 14.5% and 17.7%, respectively.

Reflection/Transmission Measurement

In order to account for reflectance of the fibers with respect to solar radiation, the following formulation was used:

$$\bar{R}_{solar} = \frac{\int_{\lambda_1}^{\lambda_2} R(\lambda) M(\lambda) d\lambda}{\int_{\lambda_1}^{\lambda_2} M(\lambda) d\lambda} \quad (3)$$

where $\bar{R}_{solar}$ is the hemispherical reflectance normalized to the AM 1.5 Global solar intensity spectrum as a function of wavelength, M($\lambda$). $\lambda_1$=400 nm and $\lambda_2$=2.5 µm are the lower and upper limits of spectra measured by a visible/near-infrared Fourier-transform spectrometer. R($\lambda$) is the measured hemispherical reflectance as a function of wavelength. The obtained value $\bar{R}_{solar}$ characterizes the percentage of sunlight reflected by the fibers.

Similarly, integrated hemispherical emissivity is defined as:

$$\bar{\varepsilon}_{T=300K} = \frac{\int_{\lambda_1}^{\lambda_2} \varepsilon(\lambda) I(T, \lambda)_{blackbody} d\lambda}{\int_{\lambda_1}^{\lambda_2} I(T, \lambda)_{blackbody} d\lambda} \quad (4)$$

where $\varepsilon(\lambda)$ is the measured hemispherical emissivity as a function of wavelength, $\lambda_1$=6 µm and $\lambda_2$=14 µm are the lower and upper limits of spectra measured by a Fourier-transform infrared spectrometer, and I(T,$\lambda$)$_{blackbody}$ is the spectral intensity of a blackbody at T=300 K. The obtained value $\bar{\varepsilon}_T$=300 K characterizes the ability of the fibers to dissipate heat through thermal radiation.

Finite-Difference Time-Domain Simulations

Finite-difference time-domain (FDTD) (Lumerical FDTD solutions) simulations were conducted to investigate reflection of the cocoon fiber as a function of incident polarization. A transverse cross-sectional SEM image of a comet moth fiber was imported into the software to obtain the structure used in FDTD simulations (FIG. 6A). The voids were assumed to be invariant in the longitudinal direction of the fiber. A refractive index of n=1.5 was assigned to the material at all wavelengths, and no absorption was considered in the simulations.

Figure 6B:
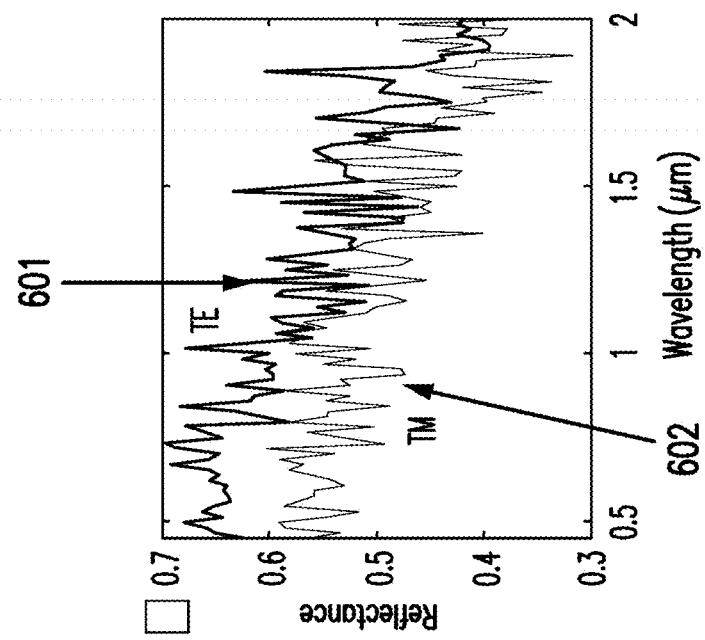
FIG. 6B is a diagram illustrating simulated reflectance spectra of a single cocoon fiber with TE 601 and TM polarized excitations 602.
Figure 6A:
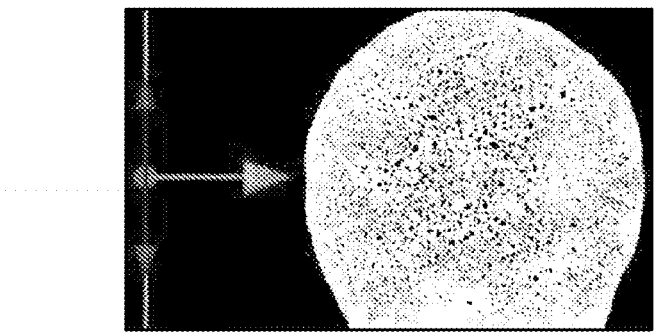
FIG. 6A is an image of a structure extracted from a comet moth cocoon fiber and used in FDTD simulations.

The simulated reflectance spectra show that reflection of TE polarized incident light 601 is higher than that of TM polarized light 602 (FIG. 6B). It is also observed that as the wavelength of light increases towards the near-infrared, reflectance decreases. This trend matches the measurement results, which show that the scattering strength of the fiber material decreases as the wavelength of light becomes substantially larger than the size of the voids.

The simulated temporal profile of an ultra-short pulse passing through the cocoon fiber along the transverse direction (FIG. 6C) confirms the time-of-flight measurement results, which show that TE polarized light 603 interacts stronger with the voids, leading to a more elongated tail of the pulse. Photon lifetimes estimated from the simulations are 270 fs for TE 603 polarized light and 230 fs for TM polarized light 604.

Time-of-Flight Measurements

Figure 7:
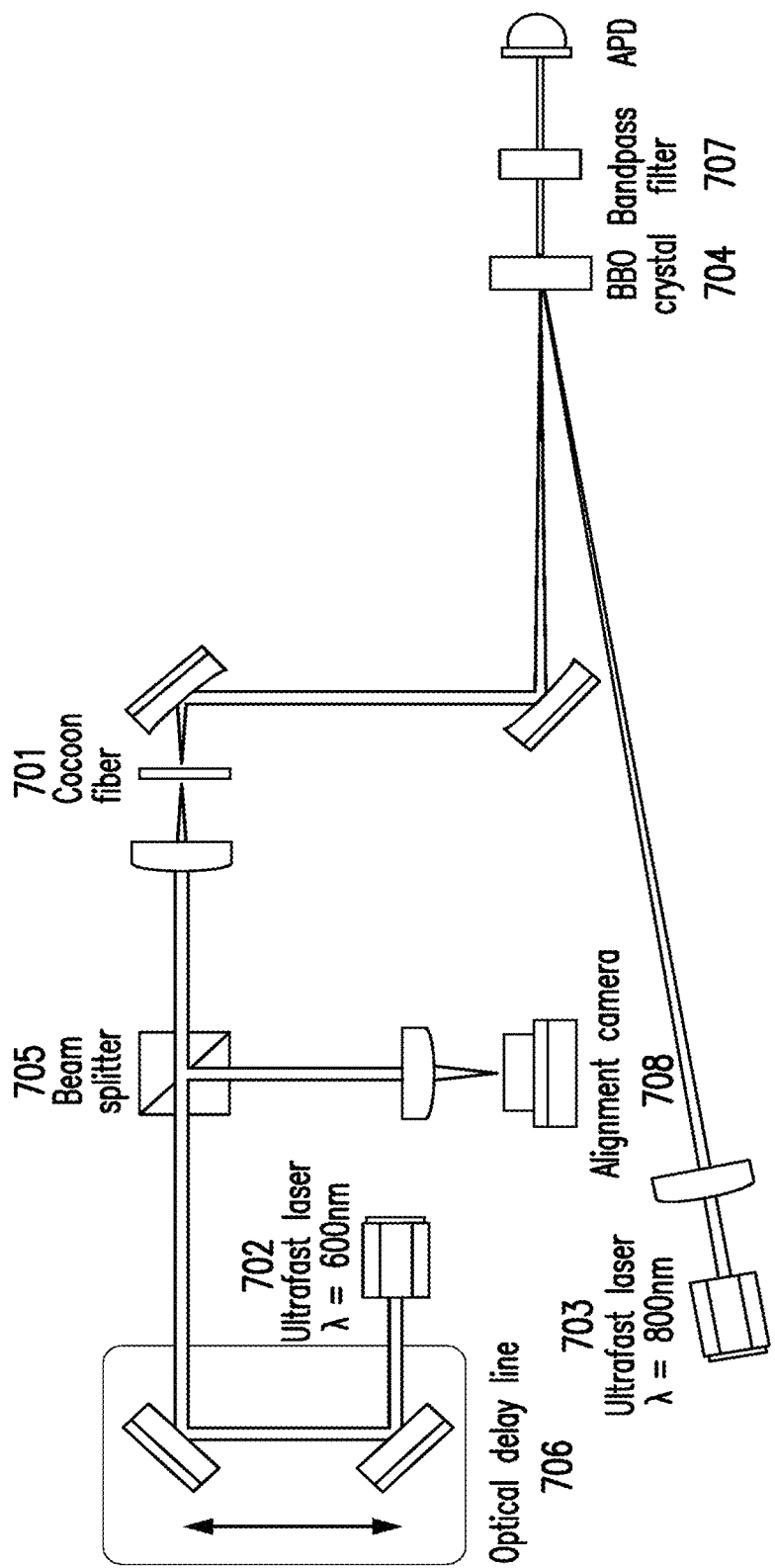
FIG. 7 is a schematic diagram illustrating the time-of-flight measurement technique.
Figure 10:
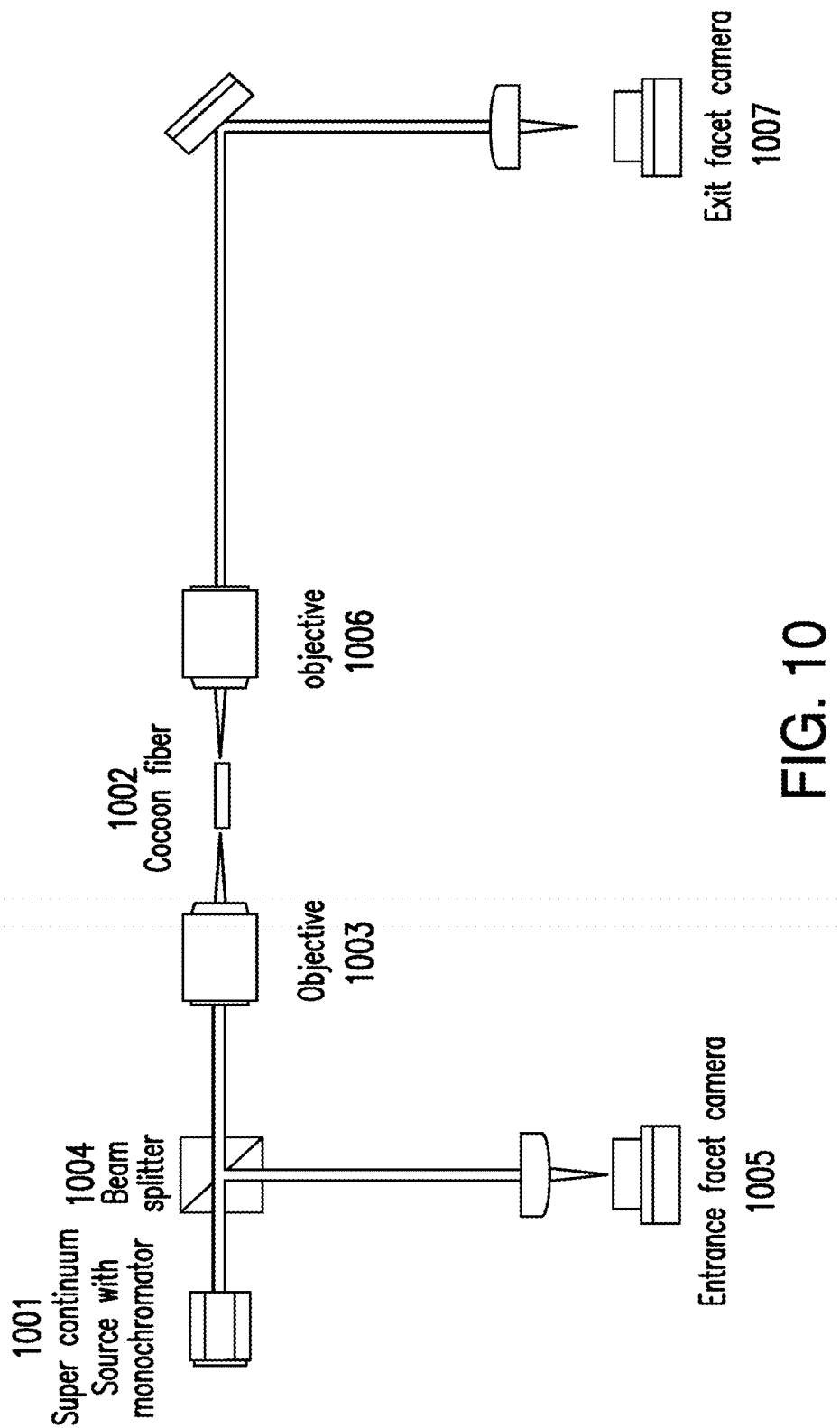
FIG. 10 is a schematic diagram illustrating exemplary optical setup used to characterize light transport in fibers supporting transverse Anderson localization.

The photon lifetime of ultra-short pulses passing through the cocoon fibers 701 was characterized using the time-of-flight measurement technique. Two ultra-short pulsed laser beams, the probe beam 702 and the reference or gate beam 703, were used. A schematic of the experimental setup is illustrated in FIG. 7. A 50× long-working-distance objective was used to focus the probe beam ($\lambda$=600 nm) onto a single cocoon fiber 701. An imaging arm and camera 708 were added to ensure proper alignment between the input beam and the fiber. The light that passes through the fiber was collected using a parabolic reflector. The collected signal and the reference beam ($\lambda$=800 nm) were focused and spatially and temporally superpositioned onto a Beta Barium Borate (BBO) crystal 704. The generated sum-frequency signal ($\lambda$=342.86 nm) passed through a narrow bandpass filter 707 and was collected with a photomultiplier tube (PMT). By varying the delay 706 between the two beams, the temporal profile of the probe beam after its interaction with the fiber can be reconstructed. Instrument response function (IRF) of the experimental setup was similarly obtained, where the probe beam did not interact with any specimen.

The probe beam and reference beam have very similar gaussian shaped temporal profiles, and therefore the cross-correlation of the two pulses should also be represented by a gaussian function. A gaussian function was first used to fit the temporal profile of the cross-correlation between the reference and the probe beam before interacting with the fiber specimen. The fitted function was then convolved with an exponential decaying function with a time constant $\tau$ to fit measured temporal profiles of TE and TM polarized pulses after exiting the cocoon fiber. The best fit yields photon lifetime $\tau$, which characterizes the strength of light scattering inside the random structures of the cocoon fiber.

Far-Field Scattering Pattern Characterization of Single Cocoon Fibers

As shown in FIG. 8, the far-field scattering pattern of cocoon fibers was obtained with a HeNe laser 801 at $\lambda$=633 nm. The beam from the laser was loosely focused onto a single cocoon fiber 802 using a plano-convex lens (f=25 mm). The far-field scattering pattern of the transmitted light was then captured using a CCD camera 803. A variable neutral density filter was used to maintain the peak intensity at below 80% of the saturation level of the camera for all the images collected.

Fabrication of Biomimetic Fibers Using Silk Fibroin and PVDF

Degummed *Bombyx mori* silk fibers were obtained and used as the starting point of the fibroin preparation process. A solution of 9.3-M lithium bromide (LiBr) was used to dissolve the silk fibers. A 20% weight-to-volume ratio (i.e., 1 g VS 4 ml) between silk fibroin and the LiBr solution was used to prepare a fibroin-LiBr solution. The fibroin-LiBr solution was left to completely dissolve in an oven set to 60° C. for 4 hours. The dissolved solution was transferred to a dialysis cassette (10 ml, 3500 MWCO), and dialyzed against deionized water for 48 hours. A centrifuge was used to remove impurities that were left in the solution. The fibroin-LiBr solution was further concentrated with a second set of dialysis cassettes (3 ml, 10000 MWCO), where the solution was dialyzed against a 10% Polyethylene glycol (PEG, 20 kDa) solution for 14-hours to achieve the desired concentrations (12-18%).

PVDF solutions were prepared by dissolving Poly (vinylidene fluoride-co-hexafluoropropylene) (PVDF-HFP) in Dimethylacetamide (DMA), with a weight ratio of 1:5 between PVDF-HFP and DMA. Both silk fibroin and PVDF biomimetic fibers were fabricated using wet spinning. In the case of regenerated silk fibers, 30% ammonium sulfate solution was used as the coagulant, while in the case of PVDF fibers, deionized water was used as the coagulant. As shown in FIG. 9, a syringe pump 901 connected to a 28-gauge stainless steel, blunt-tip needle 902 was used to extrude the solutions. As the solution entered the coagulation bath, phase separation and polymer precipitation occurred, where a polymer lean phase and a polymer rich phase were generated in the fiber. Eventually the portion of the fiber with polymer lean phase became the voids. These solidified porous fibers were spun onto a motorized drum 903 at a controlled speed to achieve the desired fiber diameters. The aspect ratio of the voids could be modified through a draw-down process using a second motorized 904 drum at a higher speed compared to the first drum 903, where a certain degree of elongation of the voids could be achieved inside the fiber.

Silk solutions at various concentrations (12.7, 13.9, 14.5, and 18.9%) were extruded into the coagulation bath at 20 ml/hr. The speeds of the take-up drum and draw-down drum were set at 4-8 m/min and 10-20 m/min, respectively. PVDF solutions were extruded into the coagulation bath at 10 ml/hr. The speeds of the take-up drum and draw-down drum were set at 1-2 m/min and 2-4 m/min, respectively.

Characterization of Fibers Supporting Transverse Anderson Localization

A supercontinuum laser (SuperK extreme EXU-6) coupled to a filter-based monochromator ($\lambda$=400-1050 nm, LLTF Contrast) 1001 was used as the light source. Light was focused onto the entrance facet of one cocoon fiber 1002 with a 50× long-working-distance objective (Mitutoyo 50×M Plan APO) 1003. An imaging arm branched out with a removable 50/50 beam splitter 1004 was used to align the incident beam with the entrance facet of the fiber 1005. A matching objective 1006, coupled to an imaging camera 1007, was used to image the intensity distribution on the exit facet of the fiber. A variable neutral density filter was used to maintain the peak intensity at below 80% of the saturation level of the camera for all the images collected. The cocoon fibers and the exit facet imaging arm of the setup were mounted on separate XYZ linear translation stages to allow independent alignment and focusing adjustments with respect to the incoming beam.

Solar Reflectance on Biomimetic Fibers with High and Low Void Concentrations

To further clarify the correlation between void concentrations and fiber reflectance over the solar spectrum, regenerated silk fibers and PVDF fibers were fabricated with both high and low void concentrations and measured their reflectance over the solar spectrum (FIG. 11A). The reflectance measurements show that PVDF 1101 and regenerated silk fibers 1102 with high void concentrations are significantly more reflective than fibers 1103, 1104 with low void concentrations. The correlation between void concentration and reflectance is further confirmed by the dark field optical microscopy images of fibers with high and low void concentrations (FIG. 11B), which show that fibers with high void concentrations 1105 and 1107 have a bright, diffused white shine, a clear indication of strong optical scattering. PVDF 1106 and regenerated silk fibers 1108 with low void concentrations, on the other hand, appear to be semi-transparent as a result of low concentration of scattering centers.

Figure 11C:
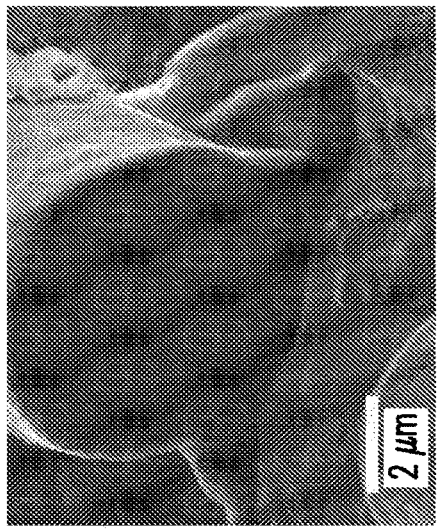
FIGS. 11C and 11D are cross-sectional SEM images of PVDF fibers with high and low void concentrations, respectively.
Figure 11E:
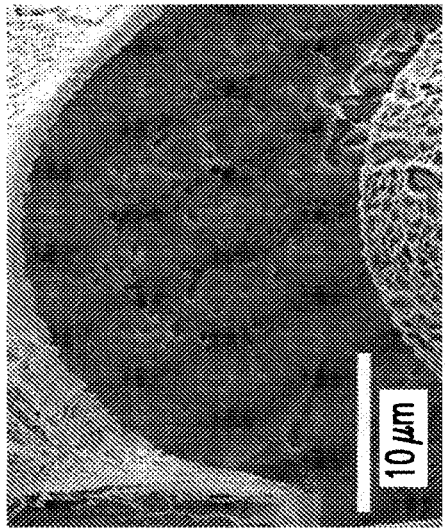
FIGS. 11E and 11F are cross-sectional SEM images of regenerated silk fibroin fibers with high and low void concentrations, respectively.
Figure 11D:
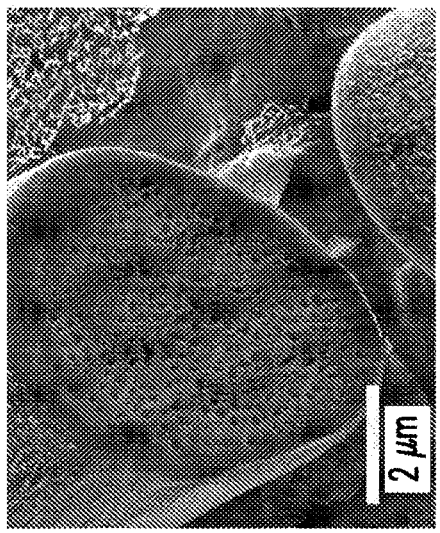
Figure 11F:

The void concentration of the regenerated silk fibers was controlled by the initial concentration of the regenerated silk solution. Concentrations of 13.9% and 18.9% were used to fabricate fibers with high and low void concentrations, respectively (FIGS. 11E and 11F). The void concentration of the PVDF fibers was controlled by the amount of time the fibers stay in the coagulation bath after they have been drawn. The fibers with high void concentrations (e.g., void density is higher about 2.2 voids/$\mu m^2$ and void filling fraction is more than 9.8%) used here did not go through a coagulation bath, while the fibers with low void concentrations were soaked in the coagulation bath for 40 hours immediately after the fiber was drawn (FIGS. 11C and 11D).

Example 3: Nano-Structured Radiative Cooling Materials and Waveguiding Optical Materials This Example illustrates fiber/fabric materials which can act as a passive radiative cooing element and reflect solar radiation while exhibit improved thermal emissivity. The synthesized fibers mimicked the structure of comet moth cocoon fibers.

Morphology

Figures 12A, 12B:
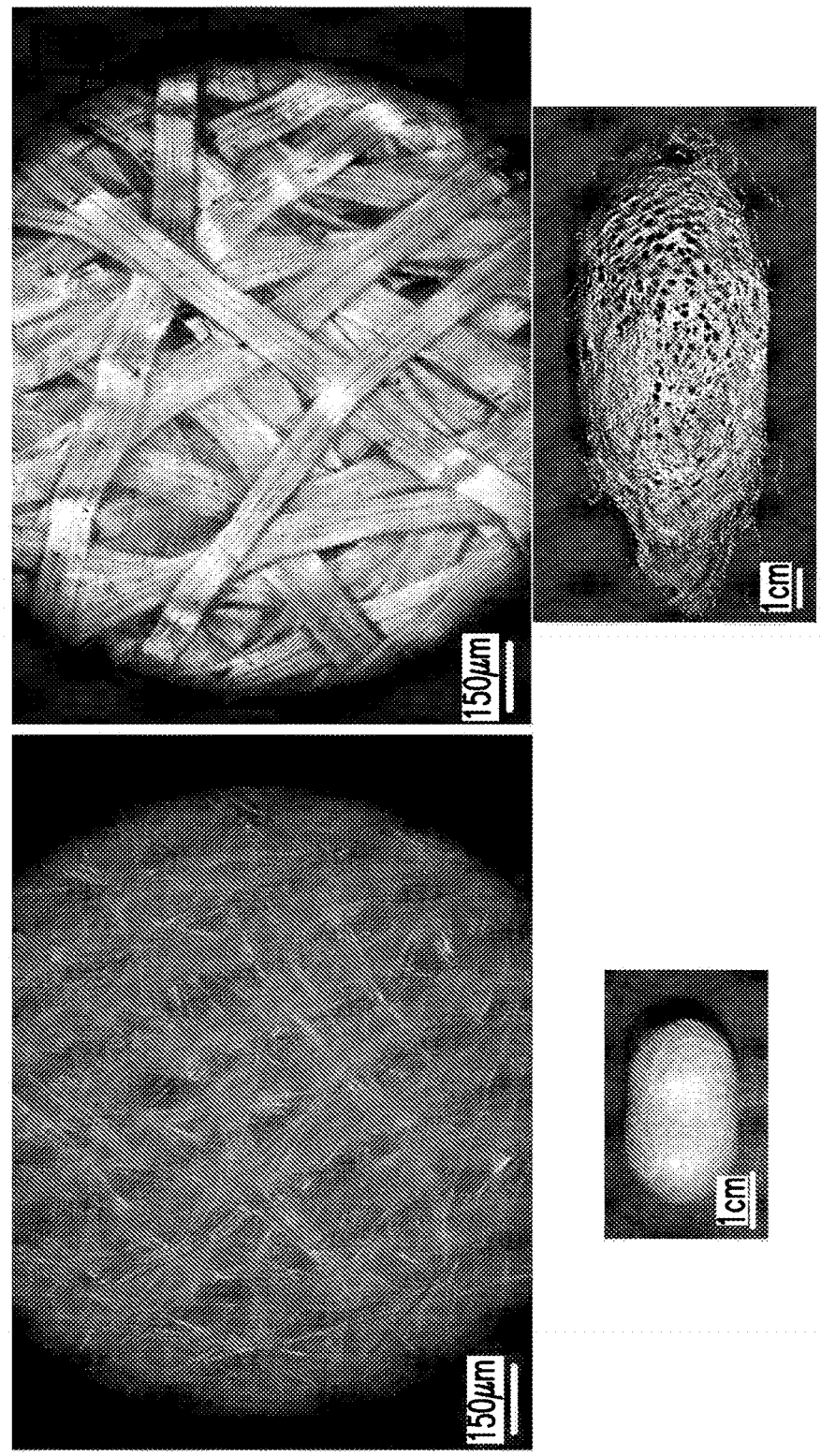
FIG. 12A is an optical image illustrating a domestic silk moth cocoon (Bottom) and a microscope image of the domestic silk moth cocoon (Top).
FIG. 12B is an optical image of a comet moth cocoon (Bottom) and a microscope image of the comet moth cocoon to show the metallic shine under illumination (Top).

Optical Microscopy Morphology. The comet moth is one of the largest wild silk moths in the world, also producing large cocoons. These cocoons exhibited a bright silvery metallic shine under the sun. FIG. 12 provided optical images of the domestic silk moth cocoon (FIG. 12A) and the comet moth cocoon (FIG. 12B). The images showed the dark field optical microscopy imaging of the cocoon fibers. For the domestic silk moth cocoon, the individual fibers were transparent and showed the improved reflectivity which was the result of light scattering at the interfaces of the fibers. The result was a diffusive white reflection (FIG. 12A). In the case of the wild comet moth cocoon, the individual fibers were reflective, and exhibited a metallic shine that suggests a certain degree of specular reflection. Each cocoon fiber consists of a pair of filaments, which are bonded together and coated by a layer of sericin (FIG. 12B). Individual fibers were lustrous, exhibiting a metallic shine when under illumination. To achieve the same amount of reflectivity, more of the domestic silk can be required than the wild comet moth cocoon.

Figure 13:
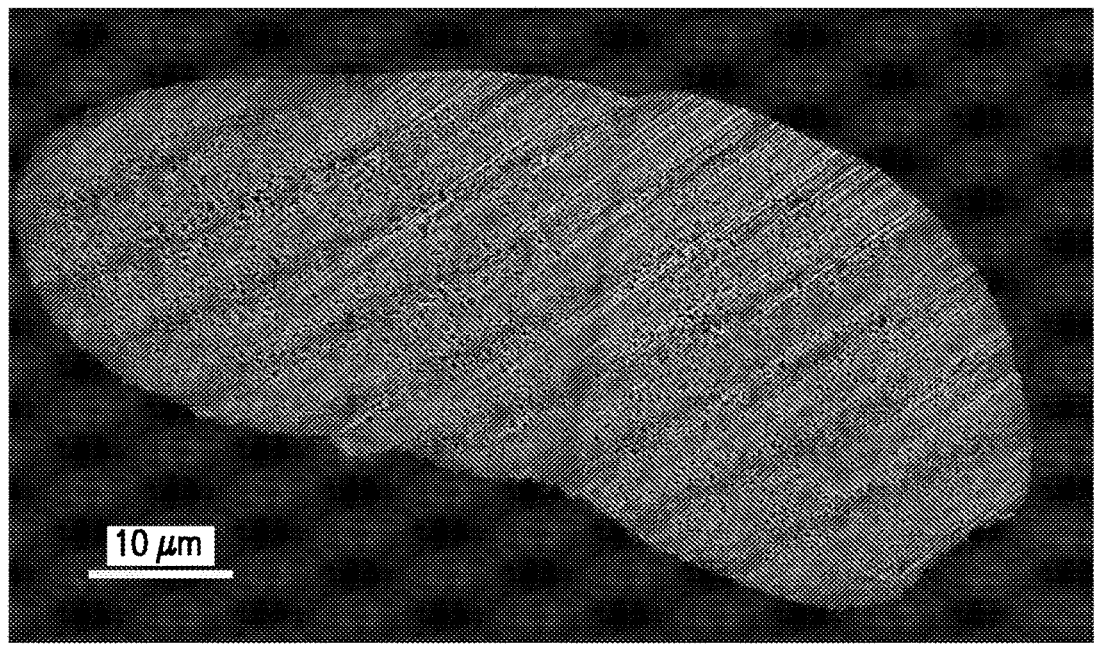
FIG. 13 is an SEM image of a comet cocoon fiber prepared by focused ion beam milling in the transverse direction.
Figure 14:
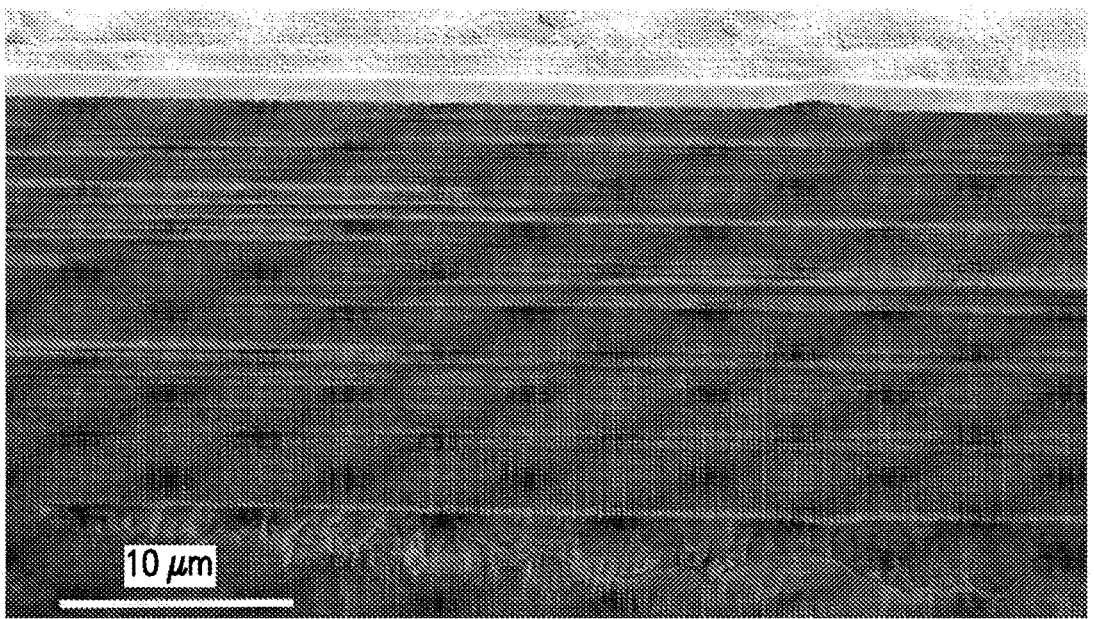
FIG. 14 is an SEM image of a comet moth cocoon fiber prepared by focused ion beam milling in the longitudinal direction.

Electron Microscopy Morphology. As shown in FIG. 13, the cross-section of one individual comet moth cocoon fiber in the transverse direction was provided. The fibers were typically 60 to 120 μm in width, and 20 to 40 μm in thickness. The transverse cross-section scanning electron microscopy image prepared by focused ion beam milling showed that this twin-filament fiber contains irregularly shaped air voids throughout the fiber. The two filaments are joined together by sericin, creating a solid region in between the two filaments that is free of voids. The sizes of these voids range from 10 nm to a few microns in width, with the smaller voids concentrated near the edge of each filament, and the larger voids near the center of the filament. The cross-section image of a fiber in the longitudinal direction showed that these individual voids are tubular structures that maintains its shape for an extended length in the longitudinal directions, creating tubular voids that stretches for about tens to hundreds of microns in length (FIG. 14).

Optical Properties

Reflection/Transmission/Absorption Measurement of Cocoon Wall.

Figure 15A:
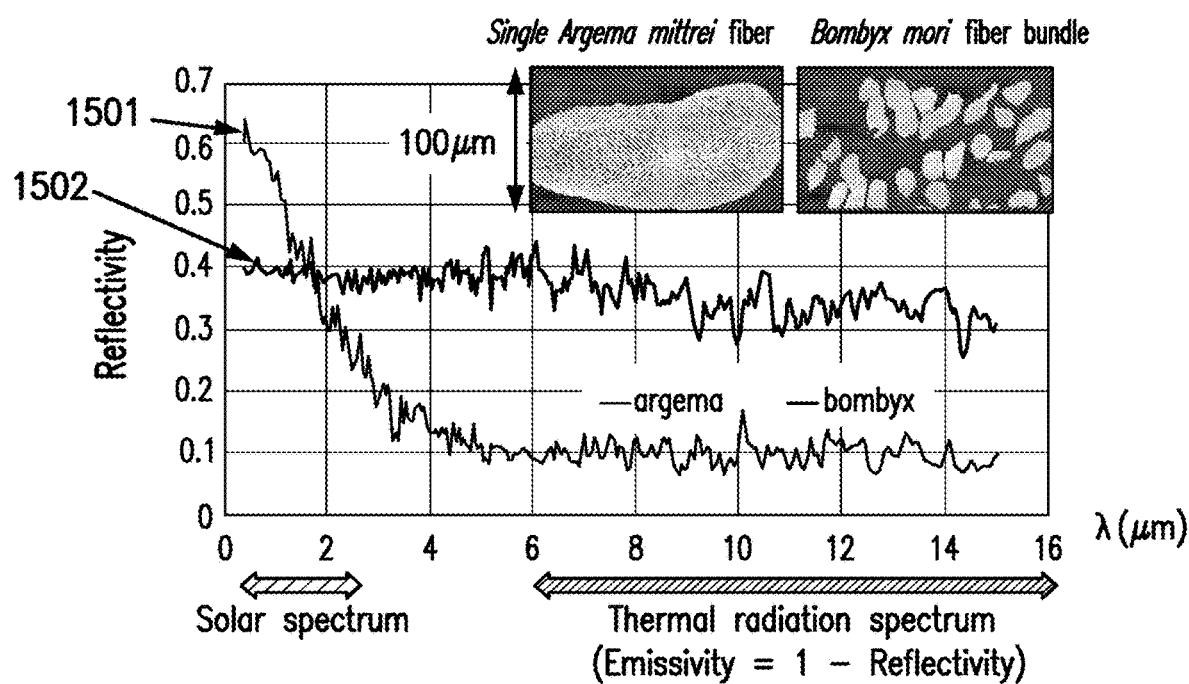
FIG. 15A is a diagram illustrating simulated hemispherical reflectance spectra comparing a single comet moth cocoon fiber and a bundle of domestic silk moth cocoon fibers of the same cross-sectional area.
Figure 15B:
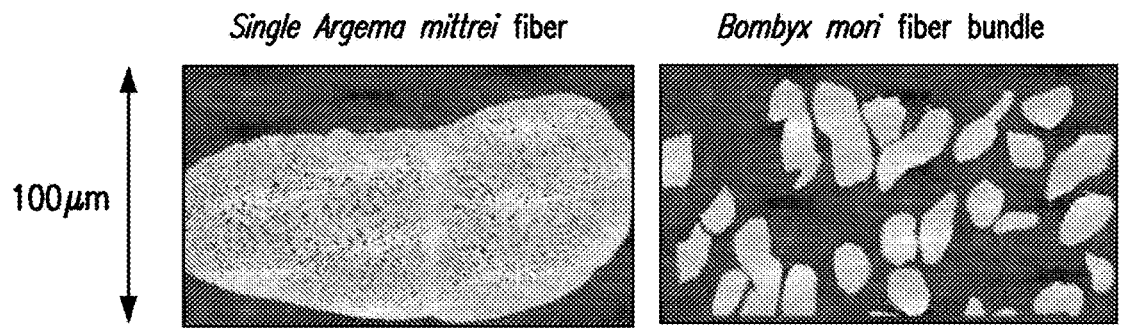
FIG. 15B illustrates the simulated structures.

As shown in FIG. 15, the comet moth fiber showed increased reflectivity in the solar spectrum due to its internal air voids and that the comet moth fiber also had increased thermal emissivity. FIG. 15A provides simulated hemispherical reflectance spectra comparing a single comet moth cocoon fiber 1501 and a bundle of domestic silk moth cocoon fibers 1502 of the same cross-sectional area. To obtain the reflectance spectra shown in FIG. 15A, reflectance spectra was calculated based on assumption that the materials do not have optical losses (extinction coefficient k=0). The domestic silk moth cocoon fibers have solid core and a cross-sectional dimension of ~10 μm. The wavelengths of thermal radiation were on the order of 10 μm. Thermal radiation was scattered by the domestic silk moth cocoon fibers, which prevented escape of the thermal radiation into the external environment, leading to reduced thermal emissivity.

Figure 16:
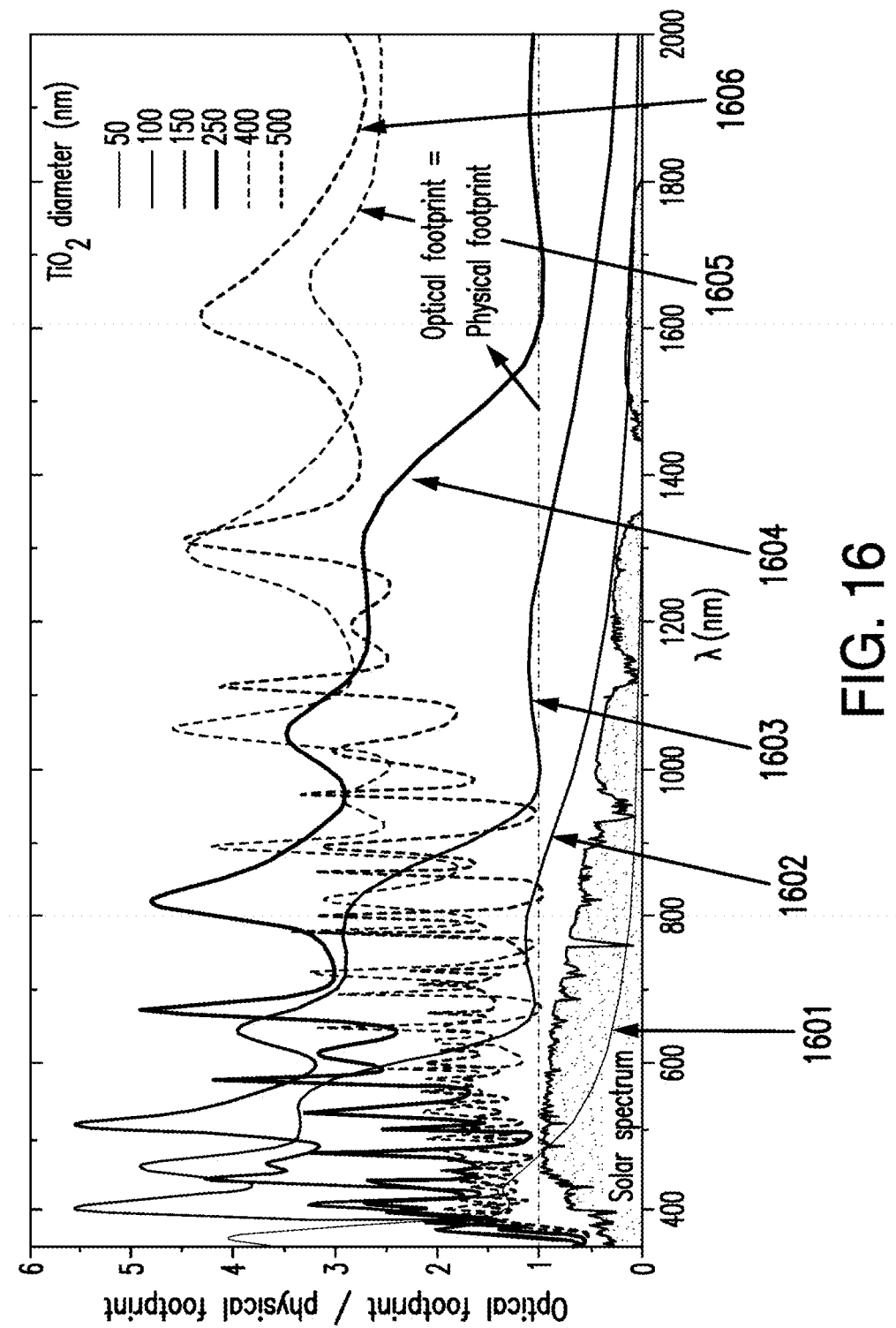
FIG. 16 shows is a diagram illustrating hemispherical reflectance spectra of $TiO_2$ spherical nanoparticles embedded in an optical medium with refractive index of 1.5.
Figure 17A:
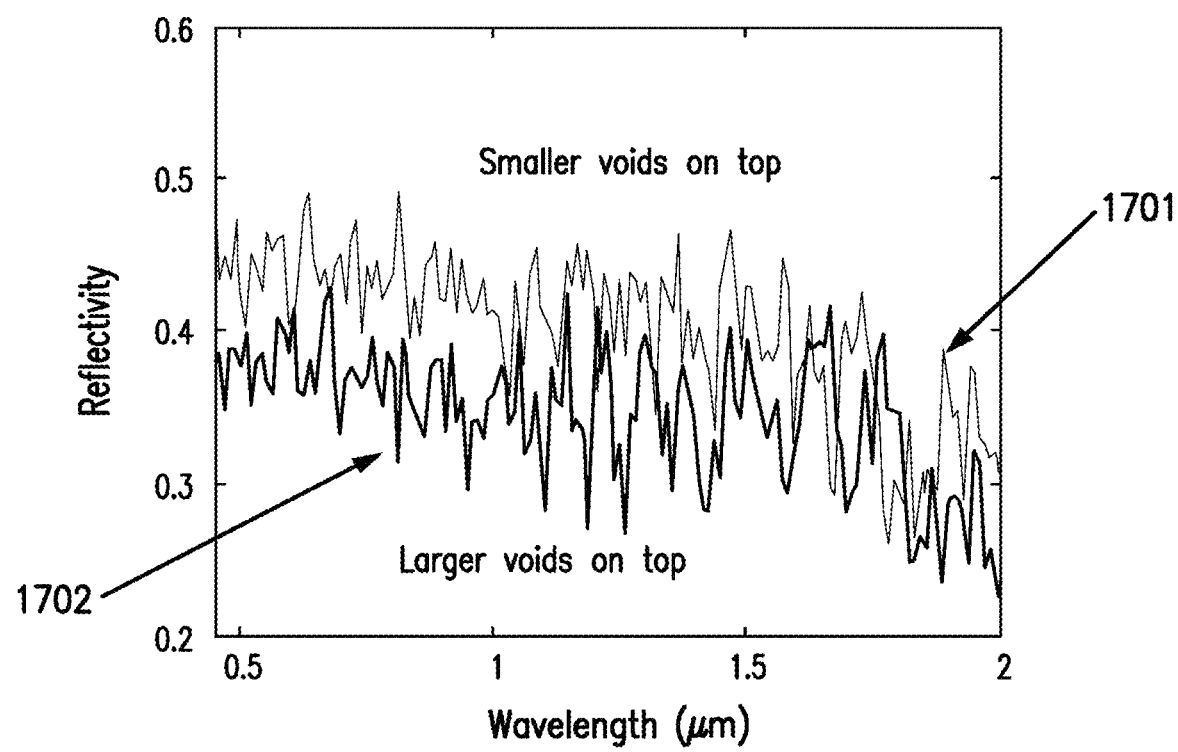
FIG. 17A is a diagram comparing simulated hemispherical reflectance spectra comparing a single comet moth cocoon fiber with smaller voids on top and a single comet moth cocoon fiber with larger voids on top.
Figure 17B:
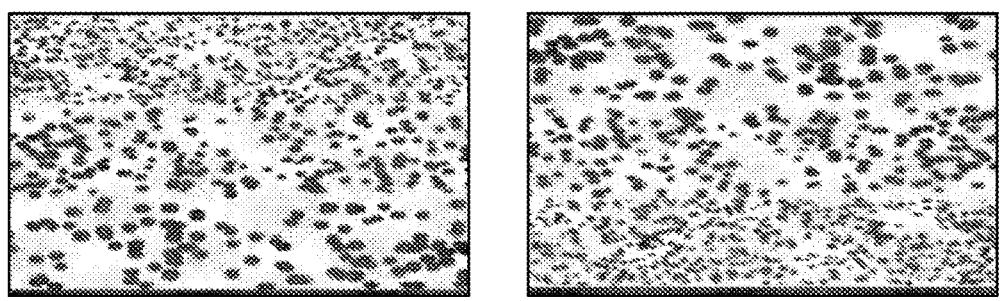
FIG. 17B illustrates simulated structures.

Structural coloration of the synthesized fiber can be controlled by the size of nanoparticles embedded in the synthetic fibers. FIG. 16 shows simulated hemispherical reflectance spectra of $TiO_2$ spherical nanoparticles embedded in an optical medium with refractive index of 1.5. The results show that 50-nm $TiO_2$ particles 1601 preferentially backscatter UV and blue light, and therefore, appear blue in color. Likewise, 100-nm $TiO_2$ particles 1602 appear blue-green; 150-nm $TiO_2$ particles 1603 appear green; 250-nm $TiO_2$ particles 1604 appear blue; and 400-nm $TiO_2$ particles 1605 and 500-nm $TiO_2$ particles 1606 can be used to enhance reflection of near-infrared component of sunlight. FIG. 17A shows a diagram comparing simulated hemispherical reflectance spectra comparing a single comet moth cocoon fiber with smaller voids on top 1701 and a single comet moth cocoon fiber with larger voids on top 1702. In non-limiting embodiments, a fiber with the smaller voids on top shows improved reflectivity compared to a fiber with lager voids on top. FIG. 17B illustrates simulated structures.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed is:

1. A method for radiative cooling of an object positioned thereunder, comprising:
   providing a fabric including one or more fibers extending for a length in a longitudinal direction; and
   introducing a plurality of void structures to each of the one or more fibers, wherein the plurality of void structures are configured to at least a portion of electromagnetic radiation received thereon in a transverse direction of the one or more fibers, wherein the plurality of void structures are configured to propagate the electromagnetic radiation in a longitudinal direction of the one or more fibers to thereby radiatively cool the object, wherein the one or more fibers are configured to have the plurality of void structures in a density between about 2.2 voids/μm² and about 17 voids/μm² to enhance a solar reflectivity in visible and near-infrared spectrums.

2. The method of claim 1, further comprising introducing the plurality of void structures into each of the one or more fibers through a wet spinning technique.

3. The method of claim 1, further comprising modifying a direction, a length, a thickness and/or the width of each of the plurality of void structures to induce optical scattering at a predetermined wavelength.

4. The method of claim 1, further comprising introducing the plurality of void structures that are positioned inside each of the one or more fibers and extended over the length of each of the one or more fibers.

5. The method of claim 1, further comprising preparing the plurality of void structures as nanostructured voids.

6. The method of claim 1, further comprising preparing each of the plurality of void structures having a diameter from about 10 nm to about 10 μm.

7. The method of claim 1, further comprising preparing each of the plurality of void structures having a tubular shape.

8. The method of claim 7, wherein each of the tubula voids has a diameter from about 10 nm to about 10 μm, and a length from 1 μm to 1 meter.

9. The method of claim 7, wherein the void structures scatter incident electromagnetic radiation at a wavelength to a transverse direction of the one or more fibers.

10. The method of claim 1, further comprising preparing the plurality of void structures of a first size to be positioned in a center region of each of the one or more fibers, and the plurality of void structures of a second size to be positioned in an edge region of each of the one or more fibers.

11. The method of claim 1, further comprising preparing each of the one or more fibers having a diameter from about 1 μm to about 1 mm.

12. The method of claim 1, further comprising preparing the one or more fibers having regenerated silk fibroin, cellulose, or a combination thereof.

13. The method of claim 1, further comprising preparing the one or more fibers having nylon, polyester, acrylic, polyolefin, or combinations thereof.

14. The method of claim 1, further comprising preparing the fabric having a fabric woven with the one or more fibers.

15. The method of claim 1, further comprising preparing the fabric having a plurality of nanoparticles each having a width from about 10 nm to about 10 μm and an optical refractive index that is different than an optical refractive index for the one or more fibers.

16. The method of claim 15, wherein the plurality of nanoparticles comprises one or more of titanium dioxide, silicon nitride, zinc oxide, aluminum oxide, silicon dioxide, and barium titanate.

* * * * *